United States Patent
Ebenezer et al.

(10) Patent No.: US 6,399,751 B1
(45) Date of Patent: Jun. 4, 2002

(54) REACTIVE DYES CONTAINING A HALOBENZENE NUCLEUS

(75) Inventors: Warren James Ebenezer, Stockport; David Greenwood, Oldham; Michael Gordon Hutchings, Bury; Michael Alan Rabjohns, Manchester, all of (GB); Andrea Maria Zamponi, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/554,325
(22) PCT Filed: Nov. 12, 1998
(86) PCT No.: PCT/GB98/03406
§ 371 (c)(1),
(2), (4) Date: Jul. 24, 2000
(87) PCT Pub. No.: WO99/27019
PCT Pub. Date: Jun. 3, 1999

(30) Foreign Application Priority Data

Nov. 12, 1997 (GB) ............................................. 9723924

(51) Int. Cl.$^7$ ........................ C09B 62/002; C09B 62/04; C09B 62/20; C09B 62/503; D06P 1/38
(52) U.S. Cl. ........................ 534/617; 534/618; 534/634; 534/635; 534/636; 534/637; 534/638; 534/642; 540/126; 540/134; 544/76; 544/189
(58) Field of Search .................................. 534/617, 618, 534/634, 635, 636, 637, 638, 642; 540/126, 134; 544/76, 189

(56) References Cited

U.S. PATENT DOCUMENTS 3,301,847 A * 1/1967 Mangani et al. ............ 534/617

FOREIGN PATENT DOCUMENTS

| | | | |
|---|---|---|---|
| FR | 1321960 | * | 6/1963 |
| GB | 882001 | * | 11/1961 |
| GB | 887870 | * | 1/1962 |
| GB | 978162 | * | 12/1964 |

* cited by examiner

*Primary Examiner*—Fiona T. Powers
(74) *Attorney, Agent, or Firm*—Oblon, Spivak, McClelland, Maier & Neustadt, P.C.

(57) ABSTRACT

This application relates to reactive dyes having at least one halobenzene nucleus linked to a chromophoric group via an amino linkage and additionally containing a second reactive group.

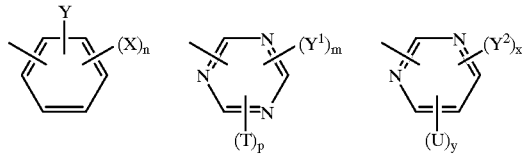

40 Claims, No Drawings

REACTIVE DYES CONTAINING A HALOBENZENE NUCLEUS

This invention relates to reactive dyes containing a halobenzene nucleus and, in particular, reactive dyes of this type containing two or more reactive components.

Dyes are known which contain a halobenzene nucleus linked via an azo group to another aromatic nucleus such that the halobenzene nucleus forms part of the chromophoric chain (see for example GB-A-882001). Dyes of this type which contain two such halobenzene nuclei are disclosed in CA64,14316d (1966), which is an English language abstract of an article by Matsui et al, Yuki Gosei Kagaku Kyokai Shi (1966), 24(2), 132–136.

Dyes are also known in which the halobenzene nucleus is attached to a chromophoric group by a sulphonamide or amide linkage; see, for example, GB-A-978162 and CA59, 12949g (1963), which is an English language abstract of an article by Matsui et al in Yuki Gosei Kagaku Kyokai Shi (1962), 20,1100–1112. Again dyes of this type may contain two such halobenzene nuclei; see GB-A-978162.

In other known dyes the halobenzene nucleus is linked to a chromophoric group by an amine linkage; see U.S. Pat. No. 3,301,847 and CA61,16193f (1964) which is an English language abstract of an article by Matsui et al in Kogyo Kagaku Zasshi, (1964), 67(1),94–97. However, such dyes contain only one reactive group.

We have now found surprisingly that dyes having at least one halobenzene nucleus linked to a chromophoric group via an amino linkage and additionally containing a second reactive group have particularly high build up, especially in warm dyeing applications.

According to the invention there is provided a dye containing
at least one chromophore D;
at least a first, halobenzene, reactive group $Z^1$, of the formula (I)

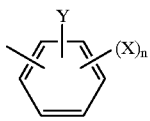
(I)

in which:
n is 1 or 2
X, or each X independently, is an electron withdrawing group; and
Y is a halogen atom;
at least a second reactive group $Z^2$ selected from
(1) a group of the formula (I), given and defined above, but selected independently thereof;
(2) a group of the formula (II)

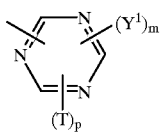
(II)

wherein
m is 1 or 2; p is 0 or 1; when m is 1, p is 1; and when m is 2, p is 0;

$Y^1$, or each $Y^1$ independently, is a halogen atom or an optionally substituted pyridinium group; and
T is $C_{1-4}$alkoxy, $C_{1-4}$thioalkoxy or $N(R^1)(R^2)$, in which each of $R^1$ and $R^2$ independently is hydrogen, optionally substituted $C_{1-4}$alkyl or optionally substituted aryl;
(3) a group of the formula (III)

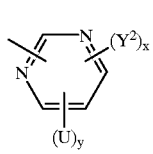
(III)

wherein:
x is 1, 2 or 3; y is zero, 1 or 2; and
$x+y \leq 3$;
$Y^2$, or each $Y^2$ independently, is a halogen atom or an optionally substituted pyridinium group; and
U or each U independently, is $C_{1-4}$alkyl or $C_{1-4}$alkylsulphonyl;
(4) a group of the formula (IV)

$$—SO_2CH_2CH_2X^1 \qquad (IV)$$

wherein $X^1$ is an eliminatable group;
(5) a group of the formula (V)

$$—SO_2(CH_2)_zCH=CH_2 \qquad (V)$$

wherein z is zero or 1; and
(6) a group of formula (VI)

$$—W—C(R^{10})=CH_2 \qquad (VI)$$

wherein:
$R^{10}$ is hydrogen, $C_{1-4}$alkyl or halogen; and
W is $—OC(=O)—$ or $—N(R^{11})C(=O)—$ in which $R^{11}$ is hydrogen or $C_{1-4}$ alkyl;
at least a first linking group $L^1$, linking the said first, halobenzene, reactive group $Z^1$ to one of components (i) the or a chromophore D and (ii) the second reactive group $Z^2$, which said first linking group $L^1$ presents an amino nitrogen to the reactive group $Z^1$ and to the component (i) or (ii) or, when component (i) contains a heterocyclic nitrogen atom, is linked directly to the nitrogen atom and which said first linking group $L^1$ optionally includes a hydrocarbon bridging group, which hydrocarbon bridging group B has at least two carbon atoms, is optionally substituted, optionally includes at least one hetero atom and is optionally a chromophore; and
when $Z^2$ is selected from the said groups (I)–(III), at least a second linking group $L^2$ linking the second reactive group $Z^2$ to one of (i) the or a chromophore D and (ii) the said first reactive group $Z^1$, which said linking group $L^2$ is selected from
(1) a linking group $L^1$, but selected independently thereof; or
(2) an amide linkage; and
(3) a sulphonamide linkage; and
optionally at least one aromatic group Ar which, when $Z^2$ is selected from the said groups (IV)–(VI), may carry the said reactive group $Z^2$.

Preferably, the linking group $L^1$ has the formula $(VII)^1$ $$N(R) \quad (VII)^1$$

wherein R is hydrogen or optionally substituted $C_{1-4}$alkyl, such that the same amino group presents itself to each of the reactive group $Z^1$ and the component (i) or (ii), as defined above; or
is a piperazinoalkylamino group of the formula $(VII)^2$

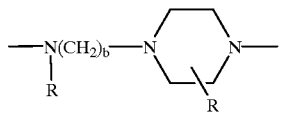

$(VII)^2$ wherein each R, independently, is as defined above, such that respective amino nitrogens, one of the piperazine group and the other of the alkylamino group, present themselves respectively, to the reactive group $Z^1$ and to the component (i) or (ii), as defined above; or
has the formula $(VII)^3$ $$—N(R)BN(R)— \quad (VII)^3$$

wherein B is a hydrocarbon bridging group as defined above, each R, independently, is as defined above and B is optionally linked additionally to at least one additional group —N(R).

The hydrocarbon bridging group B may be a straight or branched, optionally substituted, $C_{2-6}$alkylene group optionally interrupted by at least one hetero atom, for example, O, S or N. Optional substituents are OH alkoxy, carboxy, carboxylic ester or carboxamide. Alternatively the bonding group B may be an optionally substituted arylene especially phenylene group. Optional substituents are $SO_3H$ and salts thereof, $C_{1-4}$alkyl, $C_{1-4}$alkoxy and chloro. The bridging group B is especially preferably an optionally substituted aryl group.

An especially preferred dye embodying the invention has the formula (VIII)

$$Z^1—L^1—D—(L^2)_a—Z^2 \quad (VIII)$$

wherein:
D is a chromophore;
each of $L^1$ and $L^2$ is an amine or piperazine linkage of the formula $$—N(R)— \quad (VII)^1;$$

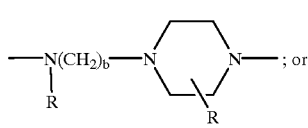

$(VII)^2$ ; or $$—N(R)BN(R)— \quad (VII)^3$$

wherein:
R, or each R independently, is hydrogen or $C_{1-4}$ alkyl;
B is a hydrocarbon bridging group which has at least two carbon atoms, is optionally substituted, optionally includes at least one hetero atom and is optionally a chromophore;
a is zero or 1; and
b is from 2 to 6 inclusive;
$Z^1$ is a group

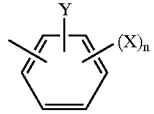

(I)

in which:
n is 1 or 2;
X, or each X independently, is an electron withdrawing group; and
Y is a halogen atom; and
when a is 1, $Z^2$ is:
a group of the formula (I), given and defined above but selected independently thereof; or
a group of the formula (II)

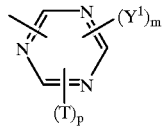

(II)

wherein:
m is 1 or 2; p is 0 or 1; when m is 1, p is 1; and when m is 2, p is 0;
$Y^1$, or each $Y^1$ independently, is a halogen atom or an optionally substituted pyridinium group; and
T is $C_{1-4}$ alkoxy, thioalkoxy or $N(R^1)(R^2)$ in which $R^1$ is hydrogen, optionally substituted $C_{1-4}$ alkyl or optionally substituted aryl and
$R^2$ is hydrogen or optionally substituted $C_{1-4}$ alkyl; or
a group of the formula (III)

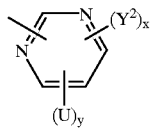

(III)

wherein:
x is 1, 2 or 3; y is zero, 1 or 2; and $x+y \leq 3$;
$Y^2$, or each $Y^2$ independently, is a halogen atom; and
U, or each U independently, is $C_{1-4}$ alkyl or $C_{1-4}$ alkyl-sulphonyl; and
when a is zero, $Z^2$ is:

$$—SO_2CH_2CH_2X^1 \quad (IV)$$

in which $X^1$ is an eliminatable group; or $$—SO_2(CH_2)_zCH=CH_2 \quad (V)$$

wherein z is zero or 1; or
a group of formula (VI)

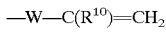

wherein:
$R^{10}$ is hydrogen, $C_{1-4}$alkyl or halogen; and
W is —OC(=O)— or —N($R^{11}$)C(=O)— in which $R^{11}$ is hydrogen or $C_{1-4}$ alkyl.

In the halobenzene nucleus of the formula (I), X or each X independently, may be selected from nitro, cyano, alkylsulphonyl, dialkylaminosulphonyl and sulphonic acid groups and salts thereof. Preferably, X or each X independently, is selected from nitro and cyano.

The halogen atom in the halobenzene nucleus of formula (I) is preferably fluorine or chlorine.

The group R in the linking group $L^1$ of formulae (1)–(3) may be any of hydrogen, methyl, ethyl, n- or i-propyl or n-, s- or t-butyl, but is preferably hydrogen.

In the dye of formula (VII), each of $Z^1$ and $Z^2$, independently, is preferably a group of the above mentioned formula (I). Moreover, it is even more preferred that each of $Z^1$ and $Z^2$ is the same group as the other.

However, alternatively, $Z^1$ may be a halobenzene nucleus of the formula (I), A may be zero and $Z^2$ a group of the formula

in which $X^1$ is an eliminatable group such as $OSO_3H$, $OPO_3H_2$ and salts of any of these, and Cl, a preferred group (IV) being

(or a salt thereof)

or

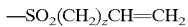

wherein z is zero or 1.

In an other alternative range of dyes, $Z^1$ is a halobenzene nucleus of the formula (I) above and $Z^2$ is a halotriazine nucleus of the formula (II)

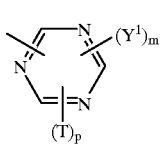

wherein m is 1 or 2, p is 0 or 1,
when m is 1, p is 1 and
when m is 2, p is 0;
$Y^1$, or each $Y^1$ independently, is a halogen atom or an optionally substituted pyridinium group; and
T is $C_{1-4}$ alkoxy, $C_{1-4}$thioalkoxy or N($R^1$)($R^2$) in which $R^1$ is hydrogen, optionally substituted $C_{1-4}$alkyl or optionally substituted aryl; and
$R^2$ is hydrogen or optionally substituted $C_{1-4}$alkyl.

In the above formula (II), $Y^1$ is preferably fluorine, chlorine or optionally substituted pyridinium which may be derived from, for example, nicotinic or isonicotinic acid or their carboxamides.

Each of $R^1$ and $R^2$ is preferably hydrogen, but at least one of $R^1$ and $R^2$ may be a $C_{1-4}$ alkyl group and indeed $R^1$ may additionally be an optionally substituted aryl, preferably phenyl, group.

When such a $C_{1-4}$ alkyl or aryl group is substituted, a preferred substituent is hydroxyl, amino, halo, carboxy or sulpho.

In yet another alternative dye in accordance with the invention, $Z^1$ is a halobenzene nucleus of the formula (I) and $Z^2$ is a halopyrimidine nucleus of the formula

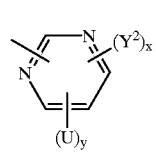

wherein
x is 1, 2 or 3; y is 0, 1 or 2; and x+y≦3;
$Y^2$, or each $Y^2$ independently, is halogen atom; and
U, or each U independently, is $C_{1-4}$alkyl or $C_{1-4}$alkylsulphonyl.

In the above formula (III) $Y^2$ is preferably fluorine or chlorine.

A preferred range of dyes embodying the invention has the formula (XXX)

wherein:
$Z^3$ is a third reactive group selected from the groups of the formulae (I)–(III), given and defined above;
each of $J^1$ and $J^2$, independently, is an optionally substituted aryl group or a chromophore;
$L^3$ is a linking group linking $Z^3$ and D;
$L^4$ is a linking group linking $Z^3$ and $J^1$;
$L^5$ is a linking group linking $Z^3$ and $J^2$;
each of q, r, s and t independently, is zero or 1;
each of $Z^1$, $Z^2$, $L^1$, $L^2$ and a is as defined above; and
when at least one of a and t is 1, $Z^2$ is selected from the groups of the formulae (I)–(III), given and defined above.

In one such range of dyes, q is 1, r is 1, s is 1, each of a and t is zero and $Z^2$ is selected from the groups of the formulae (IV)–(VI), given and defined above.

In another such range, q is 1, r is 1, s is zero, a is zero and t is 1.

In a dye of the formula (XXX), each of $L^3$ and $L^4$, independently, is preferably selected from one of the groups of the formulae (VII)$^1$, (VII)$^2$ and (VII)$^3$, given and defined above;

each of $L^3$ and $L^4$ is preferably a group of the formulae (VII)$^1$, given and defined above.

In one preferred range of dyes of the formula (XXX), q is 1, r is zero, s is 1, a is zero and t is zero and in such a range $L^3$ is preferably a group of the formula (VII)$^3$

wherein B is a triazine group substituted by a non reactive group.

In a dye of the formula (XXX), the chromophore D is preferably an azo chromophore derived from 1-hydroxy-8-aminonaphthalene substituted by at least one sulphonic acid group.

Yet another range of dyes embodying the invention has the formula $$Z^1-L^1-D^1[L^3-Z^3(L^4-Z^4)_l L^5-D^2]_k[L^2]_a Z^2$$

wherein:
- $D^1$ is a first chromophore;
- $D^2$ is a second chromophore;
- $Z^3$, when present, is a third reactive group selected from the groups of the formulae (I)–(III), given and defined in claim 1;
- $Z^4$, when present, is a fourth reactive group selected from the groups of the formulae (I)–(III), given and defined in claim 1;
- $L^3$ is a linking group linking $Z^3$ to $D^1$;
- $L^4$ is a linking group linking $Z^3$ to $Z^4$;
- $L^5$ is a linking group linking $D^2$ to one of $Z^3$ and $Z^4$;
- each of k and l, independently, is zero or 1; and
- each of $Z^1$, $Z^2$, $L^1$, $L^2$ and a is as defined in claim 1.

In one range of such dye of formula (XXXI), a is 1, $Z^2$ is a group of the formula (I), given and defined above, k is zero and $D^1$ is a tetrakisazo chromophore containing two residues of H-acid linked together by a group forming part of the chromophore.

In another such range, a is 1, each of $Z^1$ and $Z^2$ is a group of the formula (I), given and defined above, each of k and l is 1;
- each of $D^1$ and $D^2$ is a disazo chromophore containing a respective residue of H-acid,
- each of $Z^1$ and $Z^4$ is a group of the formula (II), given and defined above, and
- $L^4$ is a linking group of the formula $(VII)^2$ or $(VII)^3$, given and defined above.

In still further such ranges
(i) a is 1, $Z^2$ is a group of the formula (I), given and defined above, k is 1 and l is 1; or
(ii) a is 1, $Z^3$ is a group of the formula (I), given and defined above, k is 1 and l is zero.

Yet another preferred range of dyes embodying the invention has the formula (XXXII)

$$Z^1-L^1-Z^3-L^3-D-Z^2 \qquad (XXXII)$$

wherein:
- $Z^3$ is a third reactive group selected from the groups (I)–(III), given and defined above; and
- $L^3$ is a third linking group selected from the groups $(VII)^1$, $(VII)^2$ and $(VII)^3$, given and defined above;
- $Z^2$ is a second reactive group selected from the groups (IV)–(VI), given and defined above; and
- each of $Z^1$ and $L^1$ is as defined above.

In such dyes of the formula (XXXII), $L^1$ is preferably a linking group of the formula $(VII)^2$ or $(VII)^3$, given and defined above and $Z^3$ is preferably a group of the formula (II), given and defined above.

Another range of dyes embodying the invention has the formula (XXXIII)

Other ranges of dyes embodying the invention are of the respective formulae $$D^2-L^2-Z^2-L^3-D^1-L^1-Z^1 \qquad (XXXIV)$$

wherein:
- each of $D^1$ and $D^2$, independently, is a chromophore;
- $L^3$ is a linking group selected from groups of the formula (I)–(III), given and defined above; and
- each of $Z^1$, $Z^2$, $L^1$ and $L^2$ is as defined above; and $$\begin{array}{c} D^1-L^2-Z^2 \\ \qquad\quad \backslash \\ \qquad\qquad L^1-Z^1 \\ \qquad\quad / \\ D^2-L^3-Z^3 \end{array} \qquad (XXXV)$$

wherein:
- each of $D^1$ and $D^2$, independently, is a chromophore;
- $L^3$ is a linking group selected from the groups of the formulae (I)–(III), given and defined above; and
- each of $Z^1$, $Z^2$, $L^1$ and $L^2$ is as defined above; and $$\begin{array}{c} \qquad\quad D-[Z^3]_t \\ \qquad\quad / \\ Z^1-L^1 \\ \qquad\quad \backslash \\ \qquad\quad Ar-[Z^4]_u \end{array} \qquad (XXXVI)$$

wherein:
- one of $Z^3$ and $Z^4$ is a reactive group $Z^2$;

$$D-L^2-Z^2-L^1-Z^1 \qquad (XXXIII)$$

wherein:
- $Z^2$ is selected from groups of the formulae I–(III), given and defined above; and
- each of D, $Z^1$, $L^1$ and $L^2$ is as defined above.

In such dyes of the formula (XXXIII), $Z^2$ is preferably a group of the formula (II), given and defined above and $L^2$ is preferably a linking group selected from the groups $(VII)^1$, $(VII)^2$ and $(VII)^3$, given and defined above, more preferably a group of the formula $(VII)^2$ or $(VII)^3$, given and defined above; and $L^1$ is a group of the formula $(VII)^3$, given and defined above, in which B is an optionally substituted aryl group, or is alternatively a chromophoric bridging group.

In the range of dyes of formulae (XXXII), a preferred chromophore D is a disazo dye containing a residue derived from H-acid and having azo groups at the 2- and 7-positions.

Another preferred chromophore D is a group of the formula each of $Z^3$ and $Z^4$, independently, is a reactive group selected from the formulae (IV)–(VI), given and defined above;
each of t and u, independently, is zero or 1 and at least one of t and u is 1;

D is a chromophore;

Ar is an optionally substituted aryl group;

$L^1$ is a group of the formula

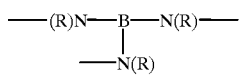

wherein each R, independently, is as defined in claim; and $Z^1$ is as defined above.

In such dyes of formulae (XXXVI), D is preferably a disazo dye containing a residue derived from H-acid.

In a dye embodying the invention, the or a chromophore D may contain a heterocyclic nitrogen atom, in which case the linking group may have the formula

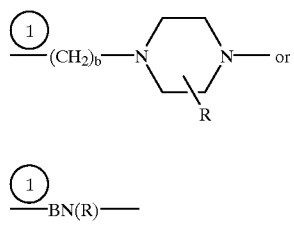

wherein each of B, R and b is as defined above and the bond ① is linked to the heterocyclic nitrogen atom of the chromophore.

Such dyes, may have the formula

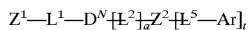

wherein:

$D^N$ is a chromophore containing a heterocyclic group including a nitrogen atom;

$L^1$ is a group of the formula $(VII)^4$ or $(VII)^5$, given and defined above, directly attached via the bond ①, to the nitrogen atom of the said chromophore $D^N$;

Ar is an optionally substituted aryl group;

and each of $Z^1$, $Z^2$, $L^2$, $L^5$, a and t is as defined above.

A typical chromophore D containing a heterocyclic nitrogen atom has the formula

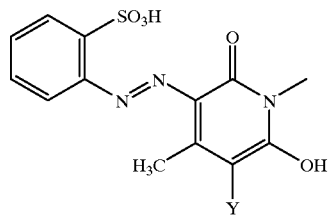

In the above formulae, wherever $L^1$–$L^5$, $J^1$, $J^2$ or B is or has an optionally substituted phenyl group, optional substituents are $SO_3H$ or a salt thereof, $C_{1-4}$alkyl, especially methyl and chloro, especially $SO_3H$.

Again, in all of the above formulae, where the groups $Z^2$ is any of the groups of the formulae (I)–(III), it is most preferably of the formula (II).

Likewise in all such formulae, where $Z^2$ is any of the groups (IV)–(VI), it is most preferably of the formula (IV) or (V), wherein Z is zero.

In a dye according to the invention, in general, the or each chromophoric group independently preferably comprises an azo (which may be a monoazo, polyazo or metal complex azo), anthraquinone, hydrazone, phthalocyanine, triphenodioxazine or formazan group. Examples of chromophoric groups which may be present are those given as types (a)–(g) of the group "$D_1$" in formula (I) of U.S. Pat. No. 5,484,899, which is incorporated herein by reference.

Preferred azo groups are monoazo and disazo groups. Preferred monoazo groups have the formula

wherein $Ar^1$ is an aryl or heteroaryl group and $Ar^2$ is an aryl group.

It is preferred that each aryl group independently is a mono- or di-cyclic aryl group. Preferred aryl groups are optionally substituted phenyl and optionally substituted naphthyl. Preferred heteroaryl groups are pyridonyl and pyrazolonyl.

A first preferred monoazo group is of the Formula (IX) (or salt thereof):

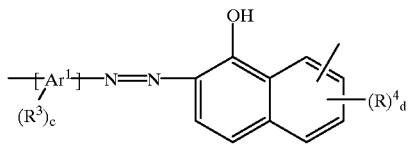

wherein:

$Ar^1$ is an aryl group, preferably a benzene or naphthalene nucleus;

$R^3$, or each $R^3$ independently, is $C_{1-4}$ alkyl, nitro, halo or sulphonic acid or a salt thereof;

c is zero or 1 to 4;

$R^4$, or each $R^4$ independently, is a sulphonic acid or a salt thereof; and d is 1 or 2;

and is more preferably of the formula:

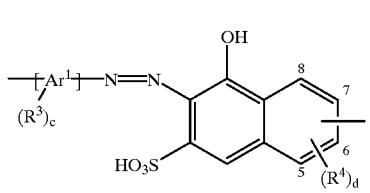

wherein each of $Ar^1$, $R^3$ and a are as defined above, $R^4$ is sulpho and c is zero or 1.

$Ar^1$ is preferably optionally substituted phenyl or naphthyl, especially a phenyl or naphthyl group having at least one sulpho substituent. Further optional substituents which may be present on Ar include a halogen atom, especially chlorine; an alkyl radical, especially $C_{1-4}$ alkyl, more especially methyl; an acylamido radical, especially acetylamino, benzamido or sulphonated benzamido; amino; hydroxy; and an alkoxy radical, especially $C_{1-4}$ alkoxy, more especially methoxy.

As examples of phenyl groups having at least one sulpho substituent there may be mentioned 2-, 3- or 4-sulphophenyl; 2-sulpho-4-nitrophenyl; 2-sulpho-5-nitrophenyl; 4-sulpho-2-methylphenyl; 5-sulpho-2-methylphenyl; 2-sulpho-4-methylphenyl; 5-sulpho-2-methoxyphenyl; 2-sulpho-4-methoxyphenyl; 4-sulpho-2-chlorophenyl; 5-acetamido-2-sulphophenyl; 5-sulpho-2-carboxyphenyl; 2,4-disulphophenyl; 2,5-disulphophenyl; and 3,5-disulphophenyl.

As examples of naphthyl groups having at least one sulpho substituent there may be mentioned 1-sulphonaphth-2-yl; 1,5-disulphonaphth-2-yl; 1,5,7-trisulphonaphth-2-yl; 3,6,8-trisulphonaphth-2-yl; 5,7-disulphonaphth-2-yl; 6-sulphonaphth-2-yl; 4-,5-,6-, or 7-sulphonaphth-1-yl; 4,8-disulphonaphth-1-yl; 3,8-disulphonaphth-1-yl; 2,5,7-trisulphonaphth-1-yl; and 3,5,7-trisulphonaphth-1-yl.

Preferred optional substituents which may be present on the naphthalene nucleus of Formula (IX) are those mentioned above for $Ar^1$.

Groups of the Formula (IX) are preferably linked to a group $L^1$ or $L^2$ at the 6-, 7- or 8-position, especially the 6- or 8-position. When $L^1$ or $L^2$ is to be linked at the 8-position, it is preferred that $R^5$ is a sulpho group at the 5- or 6-position.

Thus a preferred monoazo dye embodying the invention has the formula (XVII)

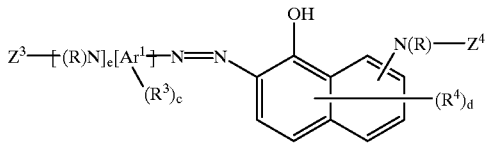

(XVII)

wherein:
each R independently and a is as defined above;
one of $Z^3$ and $Z^4$ is a group $Z^1$ and the other is a group $Z^2$;
the group $Z^4$ is selected from the groups of the formulae (I)–(III), given and defined above.
$Ar^1$ is a benzene or naphthalene nucleus;
$R^3$, or each $R^3$ independently, is $C_{1-4}$ alkyl, nitro, halo or sulphonic acid or salt thereof;
c is zero or 1–4;
$R^4$, or each $R^4$ independently, is a sulphonic acid or a salt thereof; and
d is 1 or 2.

A preferred disazo group is of the Formula (XI) (or salt thereof):

Ar¹—N=N—M—N=N—E   (XI)

wherein:
M and E are each independently optionally substituted phenylene or naphthalene; and
$Ar^1$ is as defined above.

It is preferred that E is optionally substituted naphthalene and M is optionally substituted phenylene. The optional substituents which may be present on M or E are preferably independently selected from halo, especially chloro; alkoxy, especially $C_{1-4}$ alkoxy; alkyl, especially methyl; sulpho; carboxy; hydroxy; amino; acylamino, especially acetamido, benzamido and sulphonated benzamido, and pyrimidinylamino or triazinylamino cellulose-reactive groups.

As Examples of groups represented by M and E, there may be mentioned phenylene, 2-methyl-1,4-phenylene, sulphophenylene, ureidophenylene, 7-sulpho-1,4-naphthalene, 6-sulpho-1,4-naphthalene; 8-sulpho-1,4-naphthalene and 6-hydroxy-4-sulpho-1,5-naphthalene.

An especially preferred range of disazo-dyes has the formula (XVIII)

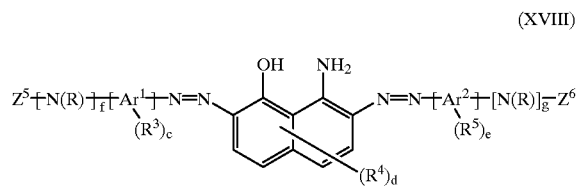

(XVIII)

wherein:

one of $Z^5$ and $Z^6$ is a group $Z^1$ and the other is a group $Z^2$;

each of f and g independently is zero or 1;

when $Z^5$ or $Z^6$ is any of the groups of the formulae (I)–(III), given and defined above, f or g respectively is 1 and when $Z^5$ or $Z^6$ is any of the groups of the formulae (IV)–(VI), given and defined above, f or g respectively is zero;

each of c and e, independently, is zero or 1–4;

d is 1 or 2;

each R independently is as defined above;

each of $Ar^1$ and $Ar^2$ independently is an optionally substituted aryl group; and each of $R^3$ and $R^4$ is as defined above.

In a dye of the formula (XVIII), each of $Z^5$ and $Z^6$ may be the same group

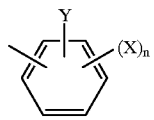

wherein X, Y and n are as defined above.

Alternatively, one of $Z^5$ and $Z^6$ may be a group of the formula (I), given and defined above, and the other of $Z^5$ and $Z^6$ may be selected from groups of the formulae (II) and (III), given and defined above. In such a dye it is preferred that one of $Z^5$ and $Z^6$ is a group of the formula (I), given and defined above, and the other of $Z^5$ and $Z^6$ is a group of the formula (II).

Another especially preferred range of disazo dyes has the formula

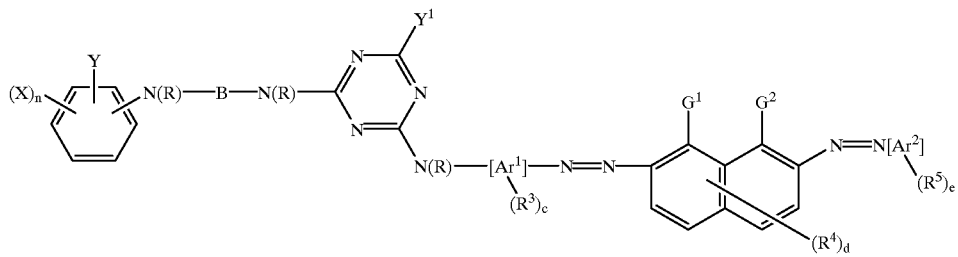

wherein:
B is a hydrocarbon bridging group as defined above, and preferably an optionally substituted aryl group;
one of $G^1$ and $G^2$ is OH and the other is $NH_2$;
each of X, Y, $Y^1$, $Ar^1$, $Ar^2$, $R^3$, $R^4$, $R^5$, c, d and e is as defined above.
In a dye of the formula (XVIII), one of $Z^5$ and $Z^6$ may be a group

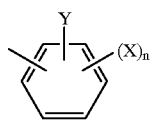

(I)

wherein:
X, Y and n are as defined in claim 1 and the other of $Z^5$ and $Z^6$ is the group $-SO_2CH_2CH_2OSO_3H$ or $-SO_2CH=CH_2$.
Typically such a dye has the formula

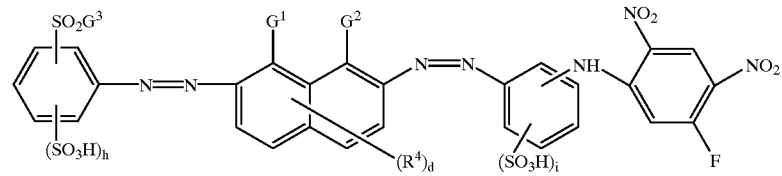

wherein
$G^3$ is $C_2H_4OSO_3H$ or a salt thereof or $-CH=CH_2$;
$G^1$ and $G^2$ are as defined above;
$R^4$ and d are as defined above; and
each of h and i, independently, is zero, 1 or 2.
A more preferred range of such dyes has the formula

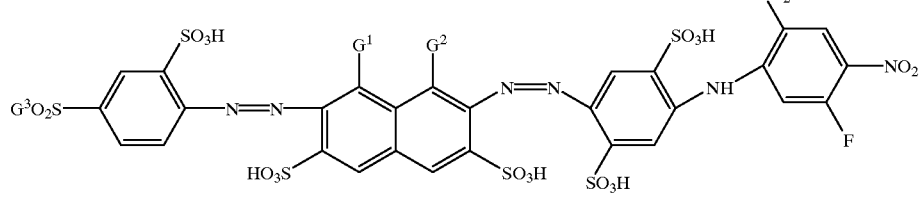

where each of $G^1$ $G^2$ and $G^3$ is as defined above.

When the chromophore D is an anthraquinone, a preferred anthraquinone group is of the Formula (XII) (or a salt thereof).

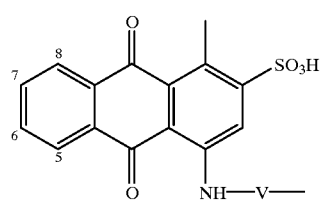

(XII)

wherein the anthraquinone nucleus optionally contains a sulphonic acid group in the 5-, 6-, 7-, or 8-position and V is a divalent organic linking group, preferably of the benzene series.
V is a bridging group B, preferably phenylene, diphenylene, or 4,4'-divalent stilbene or azobenzene radicals which are optionally sulphonated. It is preferred that V contains one sulphonic acid group for each benzene ring present therein.

A preferred anthraquinone dye of has the formula $$D^A-L^3-Ar-L^2-Z^2-L^1-Z^1$$

wherein:
$D^A$ is an anthraquinone chromophore;
$L^3$ is a linking of the formula (VII)$^1$, given and defined above;

Ar is an optionally substituted aryl group; and
each of $Z^1$, $Z^2$, $L^1$ and $L^2$ is as defined above.

More preferably each of $L^1$ and $L^2$ independently, is a linking group of the formula $(VII)^1$, $(VII)^2$ or $(VII)^3$, given and defined above; and still more preferably, each of $L^1$ and $L^2$, independently is a group of the formula $(VII)^3$, given and defined above, in which B is an optionally substituted aryl group.

When the chromophore D is a phthalocyanine, a preferred phthalocyanine group is of the Formula (XIII) (or a salt thereof).

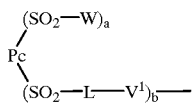

(XIII)

wherein Pc is a metallo-phthalocyanine nucleus, preferably copper or nickel phthalocyanine; L is as hereinbefore defined; each W independently is a hydroxy or a substituted or unsubstituted amino group, $V^1$ is a divalent organic linking group, preferably a $C_{1-4}$-alkylene or phenylene linking group; and a and b are each independently 1, 2 or 3 provided that a+b is not greater than 4.

Preferably such a metal phthalocyanine dye has the formula

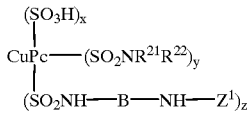

wherein:
Cu Pc is a copper phthalocyanine chromophore;
$x+y+z \leq 4$;

each of $R^{21}$ and $R^{23}$, independently is hydrogen or optionally substituted $C_{1-4}$alkyl;
B is a hydrocarbon bridging group; and
$Z^1$ Is as defined above.

When the chromophore D is a triphenodioxazine a preferred triphenodioxazine group is of the Formula (XIV) (or a salt thereof).

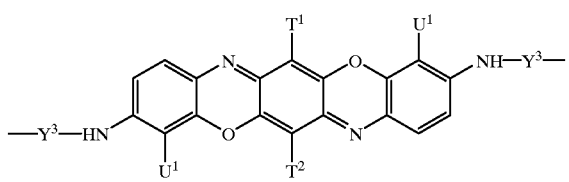

(XIV)

wherein:
each $Y^1$ independently is a covalent bond, $C_{2-4}$-alkylene phenylene or sulphophenylene;
$U^1$ is H or $SO_3H$; and
$T^1$ and $T^2$ are halo, especially chloro, $C_{1-4}$-alkyl, or alkoxy.
Each $Y^3$ is preferably $—C_2H_4—$ or $—C_3H_6—$, $U^1$ is preferably $SO_3H$ and $T^1$ and $T^3$ are preferably Cl, methyl or ethyl.

Preferably such a triphendioxazine dye has the formula

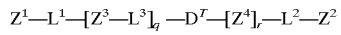

wherein:
$D^T$ is a triphendioxazine chromophore; each of $L^2$, $L^3$ and $L^4$, independently, is a linking group of the formula $(VII)^1$, $(VII)^2$ or $(VII)^3$, given and defined above;
each of $Z^2$, $Z^3$ and $Z^4$ is a reactive group selected from groups of the formulae (I)–(III), given and defined above;
each of q and z is zero or 1; and
each of $Z^1$ and $L^1$ is as defined above.

In such a dye, $Z^2$ is preferably a group of the formula (I), given and defined above and each of $Z^3$ and $Z^4$ is a group of the formula (II), given and defined above; and each of $L^1$, $L^2$, $L^3$ and $L^4$ is preferably a group of the formula $(VII)^3$, given and defined above.

When the chromophore D is a formazan, a preferred group is of the Formula (XV) (or a salt thereof).

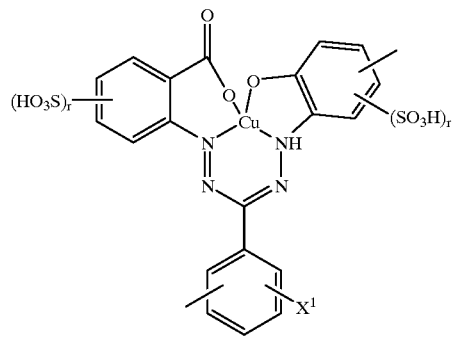

(XV)

wherein:
$X^1$ is H, $SO_3H$ or Cl; and
each r independently has a value of 0, 1 or 2.
provided that the formazan group has at least one, and preferably at least two, sulpho groups.

It is preferred that each r has a value of 1.
Preferably such a formazan dye has the formula

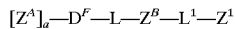

wherein:
$D^F$ is a formazan chromophore;
one of $Z^A$ and $Z^B$ is a group $Z^2$, given and defined above;
each of $L^3$ and $L^4$ is a linking group of the formula $(VII)^1$, $(VII)^2$ or $(VII)^3$, given and defined above;
each of $Z^1$ and $L^1$ is as defined above;
α is zero or 1;
$Z^A$ is selected from groups of the formulae (IV)–(VI), given and defined above; and
$Z^B$ is selected from groups of the formulae (I)–(III); given and defined above.

According to one process aspect, the invention provides a process for preparing a dye of the formula

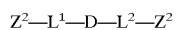

(VIII)¹ wherein:
D is a chromophore;
each of $L^1$ and $L^2$ independently, is N(R);

each R, independently, is hydrogen or $C_{1-4}$alkyl;
each of $Z^1$ and $Z^2$ is a group

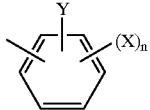
(I)

in which:

n is 1 or 2

$X_n$ or each X independently, is an electron withdrawing group; and

Y is a halogen atom, which process comprises reacting a chromophoric compound of the formula (XX)

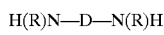
H(R)N—D—N(R)H    (XX)

wherein each of D and R is as defined above, with at least two moles, per mole of the chromophoric compound of the formula (XX), of a dihalobenzene component comprising at least one dihalobenzene compound of the formula (XXI)

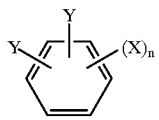
(XXI)

wherein each of X, Y and n is as defined above, to obtain the dye of the formula (VIII)¹.

When the dye is of the formula (XVIII) given above, the chromophoric compound of the formula (XX) can be prepared by protecting one amino group of a phenylene diamine sulphonic acid and then diazotising this and coupling a first portion of the diazotised phenylene diamine sulphonic acid to the naphthalene nucleus under acid conditions so as to couple or, to the benzene ring of the naphthalene nucleus containing an amino group and then taking a second portion of the same diazotised and protected phenylene diamine sulphonic acid compound referred to above (or a different such compound) and coupling this under neutral or alkaline conditions to the benzene ring of the naphthalene nucleus containing a hydroxyl group to obtain a diamine dyestuff having respective protected amino groups. The protective group can then be removed by hydrolysis.

According to another process aspect, the invention provides a process for preparing a dye of the formula (VIII)¹

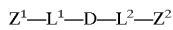
$Z^1$—$L^1$—D—$L^2$—$Z^2$    (VIII)² wherein:

D is a chromophore;

each of $L^1$ and $L^2$ independently, is N(R);

each R, independently, is hydrogen or $C_{1-4}$alkyl;

$Z^1$ is a group

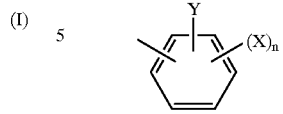
(I)

in which:

n is 1 or 2

X, or each X independently, is an electron withdrawing group; and

Y is a halogen atom; and $Z^2$ is selected from the groups (II) and (III) defined above;

which process comprises reacting a chromophoric compound of the formula (XX)

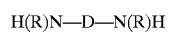
H(R)N—D—N(R)H    (XX)

wherein each of D and R is as defined above, with one mole, per mole of the chromophoric compound of the formula (XX), of each of (a) a dihalobenzene compound of the formula (XXI)

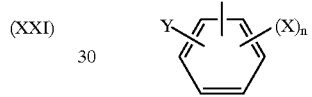
(XXI)

wherein each of Z, X, Y and n is as defined above; and (b) a compound selected from

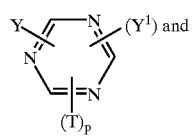
(XXII)

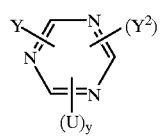
(XXIII)

wherein:

m is 1 or 2; p is 0 or 1; when m is 1, p is 1; and when m is 2, D is 0;

$Y^2$, or each $Y^1$ independently, is a halogen atom or an optionally substituted pyridinium group; and T is $C_{1-4}$alkoxy, $C_{1-4}$thioalkoxy or N($R^1$)($R^2$), in which each of $R^1$ and $R^2$ independently is hydrogen, optionally substituted $C_{1-4}$alkyl or optionally substituted aryl;

x is 1, 2 or 3; y is zero, 1 or 2; and x+y≦3;

$Y^2$, or each $Y^1$ independently, is a halogen atom or an optionally substituted pyridinium group;

U or each U independently, is $C_{1-4}$alkyl or $C_{1-4}$alkylsulphonyl; and

Y is as defined above;

the said reactions of the compound of the formula (XX) with each of the respective compounds of the formulae (XII) and (XIII) being carried out simultaneously or one before the other, in either order, to obtain a of the formula (VIII)².

According to yet another process aspect, the invention provides a process for preparing a dye of the formula (VIII)³

   (III)³ wherein:
D is a chromophore
$L^1$ is N(R), in which R is hydrogen or $C_{1-4}$alkyl;
$Z^1$ is a group

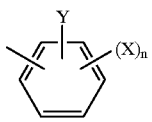   (I)

in which n is 1 or 2; X, or each X independently, is an electron withdrawing group; and Y is a hydrogen atom; and $Z^2$ is a group of the formula (IV)

—SO₂ CH₂ CH₂ X¹   (IV)

wherein $X^1$ is an eliminatable group;

a group of the formula   (V)

—SO₂ (CH₂)₂ $_{CH=CH2}$(V)

wherein z is zero or 1; and a group of formula   (VI)

—W—C(R¹⁰)=CH₂   (VI)

wherein:
$R^{10}$ is hydrogen, $C_{1-4}$alkyl or halogen; and
W is —OC(=O)— or —N(R¹¹)C(=O)— in which $R^{11}$ is hydrogen or $C_{1-4}$alkyl;
which process comprises reacting a chromophoric compound of the formula (XXIV)

H(R)N—D—Z²   (XXIV)

wherein D and $Z^2$ are as defined above, with a dihalobenzene compound of the formula (XXI)

(XXI)

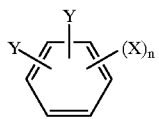

wherein each of X, Y and n is as defined above, to obtain the dye of the formula (VIII)³.

Although dye formulae have been shown in the form of their free acid in this specification, the invention also includes dyes and processes using dyes in the salt form, particularly their salts with alkali metals such as the potassium, sodium, lithium or mixed sodium/lithium salt and their salts with tetraalkylammonium ions.

The dyes may be used for dyeing, printing or ink-jet printing, for example, of textile materials and paper.

The process for colouration is preferably performed at a pH of 7.1 to 13, more preferably 10 to 12, pH levels above 7 can be achieved by performing the process for colouration in the presence of an acid-binding agent.

The substrate may be any of a textile material, leather, paper, hair or film, hot is preferably a natural or artificial textile material containing amino or hydroxyl groups, for example textile material such as wool, silk, polyamides and modified polyacrylonitrile fibres, and more preferably a cellulosic material, especially cotton, viscose and regenerated cellulose, for example, that commercially available as Tencel. For this purpose the dyes can be applied to the textile materials at a pH above 7 by, for example, exhaust dyeing, padding or printing, including ink-jet printing. Textile materials are coloured bright shades and possess good fastness to light and wet treatments such as washing.

The new dyes are particularly valuable for colouring cellulosic textile materials. For this purpose, the dyes are preferably applied to the cellulosic textile material at a pH above 7 in conjunction with a treatment with an acid binding agent.

Preferred acid-binding agents include alkali metal carbonates, bicarbonates, hydroxides, metasilicates and mixtures thereof, for example sodium bicarbonate, sodium carbonate, sodium metasilicate, sodium hydroxide and the corresponding potassium salts. The dyes benefit from the excellent build-up and high fixation.

At least for cellulosic materials, exhaust dyeing can be carried out at a relatively low temperature about 50–70° C., especially about 60° C.

The new dyes can be applied to textile material containing amine groups, such as wool and polyamide textile materials, from a neutral to mildly alkaline dyebath. The dyeing process ran be carried out at a constant or substantially constant during the dyeing process, or if desired the pH of the dyebath can be altered at any stage of the dyeing process.

The dyes may be in a liquid form, or solid form, for example in granular or powdered form.

We find surprisingly that such dyes give a much higher build up, as compared with known dyestuffs, particularly in warm dyeing applications at about 60° C.

In addition, a wide selection of dye backbones is possible, giving the potential to provide high fastness dyes.

Dyes embodying the invention are especially useful for application to substrates by ink-jet technologies. Substrates which are particularly useful are cellulosic textiles and paper.

The dye used in the ink is preferably purified by removal of substantially all the inorganic salts and by-products which are generally present in a commercial dye at the end of its synthesis. Such purification assists in the preparation of a low viscosity aqueous solution suitable for use in an ink jet printer.

To assist in the achievement of heavy depths of shades the dye should preferably have a water-solubility of at least 5%, and more preferably from 5% to 25%, by weight. Solubility of the dye can be enhanced converting the sodium salt, in which form it is normally synthesised, either partially or wholly, into the lithium or ammonium salt. Purification and ion exchange can conveniently be effected by use of membrane separation processes which permit the separation of unwanted inorganic materials and by-products directly from an aqueous solution or dispersion of the dye by partial or complete exchange of the counter-ion. The ink preferably contains, up to 20% by weight of dye and more preferably from 2% to 10%, especially from 3% to 8%.

The ink may also contain a humectant, which may also function as a water miscible solvent, which preferably campfires a glycol or dihydroxyglycolether, or mixture thereof, in which one or both hydroxy groups are secondary hydroxy groups, such as propane-1,2-diol,butane-1,3-diol and 3-(3-hydroxy-prop-2-oxy)propan-2-ol.

Where the humectant has a primary hydroxy group this is preferably attached to a carbon atom adjacent to a carbon atom, carrying a secondary or tertiary hydroxy group. The humectant may comprise up to a total of 10% by weight of a polyol, especially a glycol or dihydroxyglycolether, having two or more primary hydroxy groups, such as ethyleneglycol, propane-1,3-diol,butane-1,4-diol,2-(2-hydroxyethoxy)ethanol and 2-(2-[2-hydroxyethoxy)ethanol and/or an alcohol with a primary hydroxy group, such as ethanol,n-proponol and n-butanol. However, it preferably contains not more than 5% by weight, and is more preferably free from, such compounds. In the context of the humectant, the term "alcohol" means a compound having only one hydroxy group attached to an aliphatic carbon atom. The ink preferably contains from 5% to 25%, by weight, more especially from 10% to 20%, of humectant.

If desired, the ink may be buffered to a pH from 5 to 8, especially to a pH from 6 to 7, with a buffer such as the sodium salt of metanilic acid or an alkali metal phosphate, or di- or triethanolamine.

The ink preferably also contains one or more preservatives to inhibit the growth of fungi, bacteria and/or algae because these can block the jet of the ink jet printing equipment. Where the ink jet printing technique involves the charging and electrically controlled deflection of drops the solution preferably contains a conducting material such as an ionised salt to enhance the accumulation of charge on the crop. Suitable salts for this purpose are alkali metal salts of mineral acids. The remainder of the ink is preferably water, especially de-ionised water to avoid the introduction of impurities into the ink.

Especially preferred embodiments of the invention will now be described in more detail with reference to the following Examples in which all parts and percentages are by weight unless otherwise stated. Although preparation and dyeing with any single dye is exemplified, particular advantage could be seen when dyeing with mixtures of dyes.

PREPARATIVE EXAMPLES

Example 1

2-amino-4-(N-acetyl)aminobenzene-1-sulphonic acid (0.5M, 182 g) was dissolved in water (600 ml) at pH 7 and 2M sodium nitrite solution added (0.526M, 263 ml). This solution was added dropwise to a mixture of hydrochloric acid 35% (1.13M, 100 ml, SG=1.18) and ice (1 Kg), maintaining a temperature of 0–5° C. The mixture was stirred for 0.5 hrs with excess nitrous acid at 0–5° C. A solution of sulphamic acid (10%) was added to remove excess nitrous acid to obtain a suspension of a diazotized diamine for coupling.

H-Acid (0.475M, 183 g) was dissolved in water (600 ml) at PH 7.5. This solution was added dropwise to the above diazo suspension with good agitation over 1 hr at 0–2° C. The mixture was then stirred at 0–2° C. for a further 2 hrs at pH 2–3, and allowed to warm to room temperature over 18 hrs.

The viscous suspension was adjusted to pH 6 using sodium hydroxide solution (46/48%) and a solution of a monoazo dye was thereby obtained.

The above monoazo dye solution was cooled to 0–5° C. and a batch of the diazotized diamine prepared as above was added. The mixture was stirred at 0–5° C. and PH 6–7 for 2 hrs and subsequently over 18 hrs at room temperature while maintaining the pH at 6–7 using 2M sodium carbonate solution, thereby obtaining a diazo dye solution.

Hydrolysis was then carried out by adding sodium hydroxide solution (46/48%, 800 g) to the above diazo dye solution (vol=5L) and heating at 70–75° C. for 1.5 hrs.

The reaction mixture was Cooled to 20% and neutralised by controlled addition of 35% hydrochloric acid. After screening to remove a mull amount of impurity sodium chloride was added (15% w/v) and stirring continued to allow precipitation of the resultant diaminodisazo product. This was collected by filtration and dried at 40° C. (285 g; 0.242M; strength=69.3%).

The above diaminodisazo dye (0–01M, 11.18 g) was dissolved in water/acetone (100 ml, 1:1) at 50° C. A solution of 1,5-difluoro-2,4-dinitrobenzene (0.023M, 4.7 g taken as 100% strength) in acetone (20 ml) was added over 0.25 hr and the mixture heated at 55° C. for 3 hrs. The pH was maintained at 7 throughout the reaction by the addition of 2N sodium carbonate solution.

The reaction mixture was cooled to 20° C. and acetone (150 ml) added to precipitate the dye, The product was collected by filtration and washed with acetone (50 ml) and dried at 40° C. to give a greenish-navy dye(11.12 g; 0.0075M; strength=74.8%) ($\lambda_{Max}$=607 nm; $\epsilon_{Max}$=57,036).

Example 2

The method of Example 1 was followed except that the diaminodisazo was reacted with 1,5-dichloro-2,4-dinitrobenzene in place of 1,5-difluoro-2,4-dinitrobenzene to give a greenish-navy dye ($\lambda_{Max}$=607 nm; $\epsilon_{Max}$=48,212).

Example 3

The method of Example 1 was followed except that the diaminodisazo was reacted with 1,5-difluoro-2-cyan-4-nitrobenzene in place of 1,5-difluoro 2,4-dinitrobenzene to give a greenish-navy dye ($\lambda_{Max}$=607 nm; $\epsilon_{Max}$=56,416).

Example 4

The method of Example 1 was followed except that the diaminodisazo was reacted with 1,5-difluoro-2-nitrobenzene in place of 1,5-difluoro-2,4-dinitrobenzene to give a greenish-navy dye ($\lambda_{Max}$=608 nm; $\epsilon_{Max}$=54,660).

Example 5

4-Amino benzene sulphatoethylsulphone (0.1 m, 30 g) was stirred in ice/water (400 ml) and hydrochloric acid 35% (0.58M, 52 ml, SG=1.18) and the temperature maintained at below 5° C. 2M sodium nitrite solution (0.104M, 52 ml) was added dropwise at below 5° C. and the mixture stirred for a further 2 hours. A solution of sulphamic acid was added (10%) to remove excess nitrous acid and provide a diazo suspension for coupling.

H-Acid (0.103M, 42.6 g) was dissolved in water (300 ml) at pH 6 and the solution cooled to 5° C. This solution was added dropwise to the above diazo, suspension with good agitation, while maintaining the temperature below 5° C. The mixture was then stirred for 18 hours, allowing the temperature to rise to 20° C. Sodium chloride (10% w/v) was added and the mixture stirred for 1 hour. The precipitated monoazo dye was collected by filtration and reslurred in ethanol (600 ml) for 1 hour at 20° C. The product was collected by filtration and dried at 40° C. (70 g; 0.0825M; strength=72%).

3-Amino-5'-fluoro-2',4'-dinitrodiphenylamine-4-sulphuric acid (0.0068M, 3.2 g) was dissolved in water (100 ml) at 50–60° C. and the solution cooled to 20° C. 2M Sodium nitrite solution (0.008M, 4 ml) was added and the mixture cooled to 0–2° C. and added dropwise to ice (50 g) and hydrochloric acid 35% (0.09M, 8 ml), while maintain-

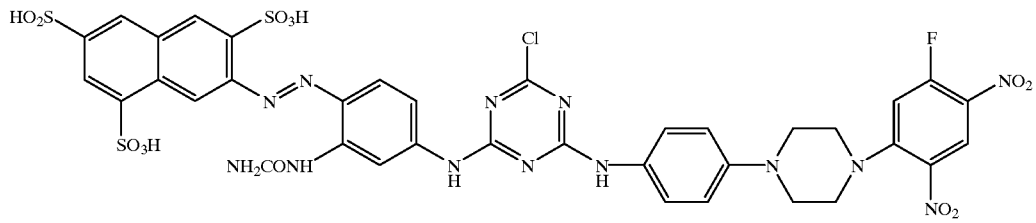

ing the temperature at 0–2° C. the resulting yellow suspension was stirred at 0–20° C. for 0.5 hour and a solution of sulphamic acid (10%) added to remove excess nitrous acid and provide a diazo suspension for coupling.

The diazo suspension Was then added dropwise to a solution of the above monoazo dye (0.006M, 5.1 g) in water (150 ml) at pH 5 and 0–2° C. The pH of the coupling mixture was maintained at pH 5 by the addition of 2M sodium carbonate solution and stirred at this pH for 18 hours, allowing the temperature to rise to 20° C. Sodium chloride was added (20% w/v) and the product collected by filtration. The solid was reslurried in ethanol (100 ml) for 1 hour at 20° C. collected by filtration and dried at 40° C. to obtain a greenish-navy dye (4.4 g: 0.003M; strength=67%; ($\lambda_{Max}$= 608 nm; $\epsilon_{Max}$=54,279) of the structure given below:

The N-diachlorotriazinyl derivative of the azo dye resulting from azo-coupling 7-aminonaphthalena-1,3,6-trisulphonic acid with m-ureidoaniline was prepared by conventional means. A solution of this dye (35 mmol in 450 ml) was added at room temperature with stirring to N-(4-aminophenyl)piperazine (7.5 g, 42 mmol) dissolved in 50/50 acetone/water (400 ml) maintained at pH 6–6.5 by addition of sodium carbonate solution. After completion of the reac-

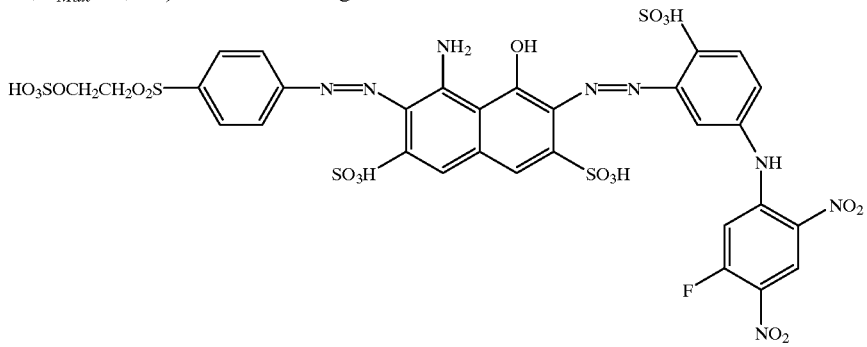

Examples 6–61

Other diazo naphthalene structures embodying the invention are shown as Examples 6 to 61 in Table 1. They can be prepared by methods analogous to those outlined in Examples 1 to 5.

Examples 62–67

Still further diazo naphthalene dyes embodying the invention, in which the chromophore has been doubled up via a linking group, are shown in Examples 62 to 67 in Table 2.

Example 68

This Example describes how a dye may be synthesised where the fibre-reactive halobenzene group is attached via a linking diamine to a second fibre-reactive group, and thereby to a chromophore.

tion the solution was concentrated, and the product was precipitated by addition of methylated spirit. To a solution of this intermediate (8.4 of mmol) in 50/50 acetone/water (200 ml) was added a solution of 1,5-difluoro-2,4-dinitrobenzene (8.5 mmol) in acetone (20 ml), maintaining the pH at 8.5 by of sodium carbonate solution. On completion of the reaction, the pH was adjusted to 6.5 and the solution was concentrates ca 100 ml. Methylated spirit was added, and the product dye was filtrated, washed with meths and dried. $\lambda_{max}$(water)= 379 nm, $\epsilon_{max}$=33000 1 mol$^{-1}$ cm$^{-1}$, half band width >150 nm. This material dyed cotton a bright golden yellow shade with very good fastness properties.

Examples 69–77

By following the principles described in Example 68, dyes of a similar nature may be prepared as further exemplified by dyes 69–77 listed in Table 3.

Examples 78–97

Disazo naphthalene dyes containing two reactive groups attached to the chromophore as described in Example 68 are exemplified by Examples 76 to 97 listed in Table 4.

Examples 98–127

Further yellow dyes may be prepared by the methods described in Examples 1–6 and 68, and are listed in Tables 5 to 9.

Examples 128–160

Monoazo naphthalene dyes embodying the invention are listed in Tables 10 to 12.

Examples 161–189

A variety of dyes embodying the invention, containing blue and green chromophores, are listed in Tables 13 to 16.

APPLICATION EXAMPLES

Examples 190–192

Each of the dyes (0.2 parts) of respective Examples 1, 3 and 5 was dissolved in respective amounts of water (50 parts) at 25° C. and pH 9. Cotton fabric 5 parts) and Glaubers salt (2.5 parts) were added. The dyes were fixed to the cotton by raising the temperature to between 50° C.–60° C., basifying to pH 11.0 and maintaining this for 1 hr. The cotton was removed and washed in soapy water to give a dark greenish-navy cotton having high general fastness properties.

Examples 193 and 194

Each of the dyes (0.2 parts) of respective Examples 2 and 4 was dissolved in water (50 parts) at 25° C. and pH 9. Cotton fabric (5 parts) and salt (4 parts) were added. The dyes were fixed to cotton by raising the temperature to 80–100° C. and maintaining this for 1 hr. The cotton was removed and washed in soapy water to give a deep greenish-navy cotton having good tastness properties.

Examples 195–198

Methodology for applying dyes embodying the present invention to cotton may be further exemplified by means of the following pad-batch dyeing protocol.

Example 195–198

Example 195. Dye from Example 5 (0.5 parts) was dissolved in water (30 parts) at 25° C. and the following agents were added: Primasol NF (1 part of 20% solution) and sodium silicate Q70 (9.5 part of 50% solution), sodium hydroxide (5.1 parts of 10% solution). The solution was made up to 50 parts by addition of water, and then padded onto woven cotton fabric (70% pick-up). The cloth to wrapped in cling film and batched at room temperature for 24 hours. The cling film was removed and the dyed cloth was rinsed successively with cold water and hot water, then washed with a soap solution, rinsed with water, and dried to give cotton coloured a dull greenish blue shade.

Example 196. If the amount of dye used in Example 193 is doubled and the procedure repeated, a greenish-navy shade is obtained.

Example 197. If the amount of dye used in Example 193 is trebled and the procedure repeated, a dark navy shade is obtained.

Example 198. If six times the amount of dye in Example 193 is used and the procedure repeated, an almost black shade is obtained.

Other dyes from the above Examples, particularly those containing the 2,4-dinitrofluorobenzene unit and/or a vinyl sulphone group or its sulphate half-ester precursor, can be applied to cotton by the same method.

Example 199

Dyes embodying the present Invention may be applied to textile substrates, especially cotton, by conventional printing technology, as the following exemplifies.

A dye from Example 5 (30 parts) was dissolved in a solution containing Manutex F 700 (500 parts of a 10% solution) and Vitexol D (20 parts). The solution was made up to 1000 parts by the addition of water and printed by means of a Zimmer screen printer. The printed cloth was dried and padded through a solution containing sodium silicate (48edge, 700 parts) made up to 1000 parts by the addition of water (80% pickup). Immediately after padding, the printed cotton was steamed in a Roaches Flash-ager steam chamber at 120 deg C. for 45 seconds. The printed cloth was rinsed in cold water, washed with a soap solution at the boil, rinsed again in cold water and dried to give a dull greenish navy print on the cotton.

Example 200

Dyes embodying the present invention may be used in the preparation of inks specially formulate for application by ink-jet technology. As an Example, the dye from Example 5 (6 parts) was dissolved in a solution of propylene glycol (15 parts) and water (79 parts). When this solution was applied to cotton which had previously been pretreated (for example, with a pretreatment agent described in E2-A-0534660) by means of commercial ink-jet printing equipment, deep navy shades were obtained.

Other dyes from the above examples as well as others described by the Invention may be used to prepare inks suitable for ink-jet printing.

Example 201

Reactive dyes, including those of Examples 1–189, are usually isolated as their sodium salts, and are contaminated with inorganic impurities resulting from the method of preparation. Dyes free of impurities suitable for ink let printing, and/or with increased solubility, may be prepared by conventional ion exchange techniques, where for example sodium is replaced by lithium and inorganic impurities are simultaneously removed.

Dye from Example 1 (10 parts) was dissolved in water (100 parts) and treated on a reverse osmosis rig until permeate conductivity was 10 micro reciprocal ohms. A solution of lithium chloride was added to the dye solution and treatment on the r.o. rig was continued until the permeate conductivity had to decreased to 1 micro reciprocal ohm, The sample was concentrated to a volume of about 80 parts, after which the solution was buffered and other formulating agents were added. The dye solution was then diluted to 90 parts by addition or water, at which stage it was suitable for storage. Dye solution prepared in this way could be diluted and applied to cotton by the methods described in any of the Examples 190, 195–198, or formulated into an ink by addition of suitable humectants and/or cosolvents, and applied by ink-jet methodology to cotton, for example by the method described in Example 200. In all these cases, dull blue, greenish navy of black, shades were imparted to the substrate, depending on the amount of dye applied.

Example 202

Dye from Example 1 was ion exchange to the lithium form as in Example 201, and formulated into an ink with the composition: dye (5 parts), propylene glycol (12 parts), diethanolamine (sufficient to buffer the final pH to 7–8.5), and water (to bring the total to 100 parts). The ink was added to the ink reservoir of an ink jet printer (e.g. HP Desk Jet 500) and printed onto paper (Logic 300), to give a black print of generally good fastness properties.

TABLE 1
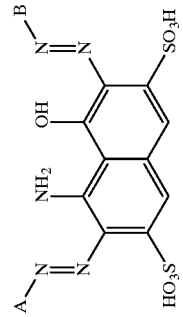
| Example | A | B | $\lambda_{max}$ nm ($w_{1/2}$ nm) Colour on cotton |
|---|---|---|---|
| 6 | 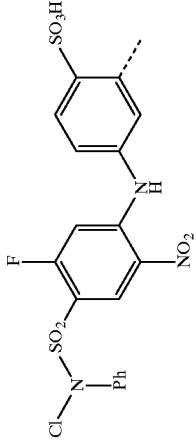 | 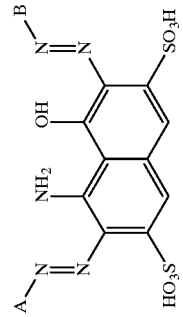 | 606 (121) greenish-navy |
| 7 | 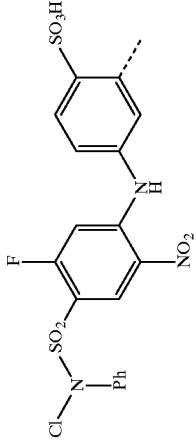 | 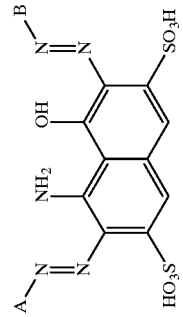 | 607 (105) greenish-navy |
| 8 | 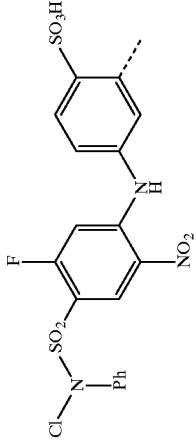 |  | 623 (121) dark bluish-green |

TABLE 1-continued

| Example | A | B | $\lambda_{max}$ nm ($w_{1/2}$ nm) Colour on cotton |
|---|---|---|---|
| 9 | 2-sulfo-4-(2-sulfatoethylsulfonyl)phenyl | 4-sulfo-2-methylphenyl-NH-(5-fluoro-4-nitro-2-nitrophenyl) | 616 (121) greenish-navy |
| 10 | 4-(2-sulfatoethylsulfonyl)phenyl | 4-sulfo-2-methylphenyl-NH-(5-fluoro-4-cyano-2-nitrophenyl) | 603 (105) greenish-navy |
| 11 | 2-sulfo-4-(2-sulfatoethylsulfonyl)phenyl | 4-sulfo-2-methylphenyl-NH-(5-fluoro-4-cyano-2-nitrophenyl) | 618 (130) greenish-navy |

TABLE 1-continued

| Example | A | B | $\lambda_{max}$ nm ($w_{1/2}$ nm) Colour on cotton |
|---|---|---|---|
| 12 | 4-(2-sulfatoethylsulfonyl)phenyl | 4-methyl-3-sulfo-linked to 5-fluoro-4-nitro-2-nitroanilino phenyl | 614 (110) dark bluish-green |
| 13 | 3-(2-sulfatoethylsulfonyl)phenyl | 4-sulfo-3-methyl-linked to 5-fluoro-4-nitro-2-nitroanilino phenyl | 594 (112) greenish-navy |
| 14 | 3-(2-sulfatoethylsulfonyl)phenyl | 4-sulfo-3-methyl-linked to 5-fluoro-4-cyano-2-nitroanilino phenyl | 595 (108) greenish-navy |

TABLE 1-continued

| Example | A | B | $\lambda_{max}$ nm ($w_{1/2}$ nm) Colour on cotton |
|---|---|---|---|
| 15 | (3-sulfophenyl sulfonylethyl sulfate) | (4-fluoro-5-nitro-2-(N-H)-aminophenyl with SO₃H and NO₂) | 604 (110) dark bluish-green |
| 16 | (4-sulfophenyl sulfonylethyl sulfate) | (naphthalene-azo-phenyl-NH-fluoronitrophenyl with SO₃H groups) | 645 (137) very dull dark green |
| 17 | (triazine with Cl, linked via NH to sulfophenyl-sulfonylethyl sulfate and to methyl-sulfophenyl-NH) | (4-fluoro-5-nitro-2-NO₂-aminophenyl with SO₃H) | 604 (119) greenish-navy |

Core chromophore (common structure): 1-hydroxy-8-amino naphthalene-3,6-disulfonic acid bis-azo with A and B coupling groups.

TABLE 1-continued

Structure:

A—N=N group at position 2, NH$_2$ at position 8, OH at position 1, N=N—B at position 7, SO$_3$H at position 3 and HO$_3$S at position 6 of a naphthalene.

| Example | A | B | $\lambda_{max}$ nm ($w_{1/2}$ nm) Colour on cotton |
|---|---|---|---|
| 18 | 2,5-disulfophenyl-NH—(6-chloro-1,3,5-triazin-2,4-diyl)—NH—(4-sulfo-3-methylphenyl)— | 5-fluoro-4-nitro-2-nitrophenyl-NH—(4-sulfo-3-methylphenyl)— | 603 (127) greenish-navy |
| 19 | 2,5-disulfophenyl-NH—(6-chloro-1,3,5-triazin-2,4-diyl)—NH—(4-sulfo-3-methylphenyl)— | 5-fluoro-4-nitro-2-nitrophenyl-NH—(2,4-disulfo-5-methylphenyl)— | 600 (134) greenish-navy |
| 20 | HO$_3$SO—CH$_2$CH$_2$—SO$_2$—(4-methylphenyl)— | 5-fluoro-4-nitro-2-nitrophenyl-NH—(2,4-disulfo-5-methylphenyl)— | 596 120 greenish-navy |

TABLE 1-continued

| Example | A | B | $\lambda_{max}$ nm ($w_{1/2}$ nm) Colour on cotton |
|---|---|---|---|
| 21 | 2-sulfatoethylsulfonyl phenyl | 5-fluoro-2-nitro-4-(4-sulfo-3-methylanilino)phenyl | 609 (111) greenish-navy |
| 22 | 4-sulfo-3-methylphenylamino / 3-sulfophenylamino chlorotriazinyl | 5-fluoro-2-nitro-4-(4-sulfo-3-methylanilino)phenyl | 604 (120) greenish-navy |
| 23 | 2-sulfatoethylsulfonyl-4-sulfo phenyl | 5-fluoro-2-nitro-4-(4-sulfo-3-methylanilino)phenyl | 625 (104) greenish-navy |

TABLE 1-continued

| Example | A | B | $\lambda_{max}$ nm ($w_{1/2}$ nm) Colour on cotton |
|---|---|---|---|
| 24 | 2-(sulfooxyethylsulfonyl)phenyl | 4-nitro-5-fluoro-2-nitrophenylamino-substituted (sulfophenyl) | 620 (112) drak bluish-green |
| 25 | 5-sulfo-2-(sulfooxyethylsulfonyl)phenyl | 4-nitro-5-fluoro-2-nitrophenylamino-substituted (sulfophenyl) | 632 (114) dark bluish-green |
| 26 | 4,6-bis(sulfophenylamino)-chlorotriazinyl | 4-nitro-5-fluoro-2-nitrophenylamino-substituted (sulfophenyl) | 609 (141) dark bluish-green |

TABLE 1-continued

| Example | A | B | $\lambda_{max}$ nm ($w_{1/2}$ nm) Colour on cotton |
|---|---|---|---|
| 27 | 4-SO₃H, 3-linked phenyl–NH–(5-F, 2-NO₂, 4-O₂N-phenyl) | 2-(β-sulfatoethylsulfonyl)phenyl | 602 (125) greenish-navy |
| 28 | 4-CO₃H, 3-linked phenyl–NH–(5-F, 2-NO₂, 4-O₂N-phenyl) | 2-(β-sulfatoethylsulfonyl)phenyl | 605 (143) dark bluisish-green |
| 29 | 4-SO₃H, 3-linked phenyl–NH–(5-F, 2-NO₂, 4-O₂N-phenyl) | 4-SO₃H, 2-(β-sulfatoethylsulfonyl)-5-linked phenyl | 596 (129) greenish-navy |

TABLE 1-continued

| Example | A | B | $\lambda_{max}$ nm ($w_{1/2}$ nm) Colour on cotton |
|---|---|---|---|
| 30 | 2-(β-sulfatoethylsulfonyl)phenyl | 4-fluoro-2-sulfo-5-(4-nitro-2-nitroanilino) with SO₃H | 607 (109) greenish-navy |
| 31 | 3-(β-sulfatoethylsulfonyl)phenyl | as above | 595 (107) greenish-navy |
| 32 | 2-sulfo-4-(vinylsulfonyl)-5-sulfophenyl | as above | 622 (123) greenish-navy |

Common coupling component (shown at top of table):

5-amino-4-hydroxy-naphthalene-2,7-disulfonic acid bis-azo with A and B (structure with OH, NH₂, two N=N linkages to A and B, and two SO₃H groups)

TABLE 1-continued

| Example | A | B | λ$_{max}$ nm (w$_{1/2}$ nm) Colour on cotton |
|---|---|---|---|
| 33 | 2-(β-sulfatoethylsulfonyl)phenyl | 4-[(4-nitro-5-fluoro-2-nitro-phenyl)amino]-2,5-disulfophenyl | 619 (114) dark bluish-green |
| 34 | 3-(β-sulfatoethylsulfonyl)phenyl | 4-[(4-nitro-5-fluoro-2-nitro-phenyl)amino]-2,5-disulfophenyl | 606 (114) dark bluish-green |
| 35 | 4-[(4-nitro-5-fluoro-2-nitro-phenyl)amino]-2,5-disulfophenyl | 4-(β-sulfatoethylsulfonyl)phenyl | 618 (113) dark bluish-green |

TABLE 1-continued
| Example | A | B | λ_max nm (w_{1/2} nm) Colour on cotton |
|---|---|---|---|
| 36 | 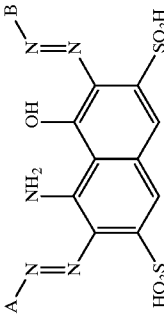 | 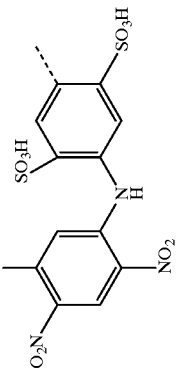 | 616 (110) dark bluish-green |
| 37 | 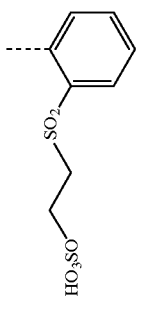 | 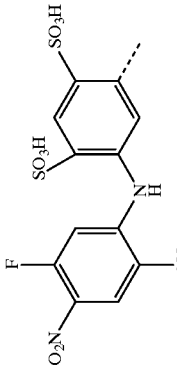 | 616 (106) greenish-navy |
| 38 | | | 616 (111) dark bluish-green |

TABLE 1-continued
| Example | A | B | $\lambda_{max}$ nm ($w_{1/2}$ nm) Colour on cotton |
|---|---|---|---|
| 39 | 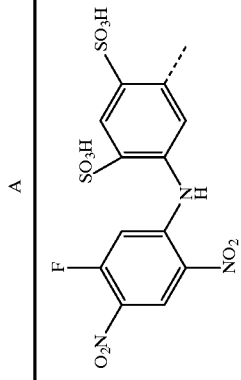 | 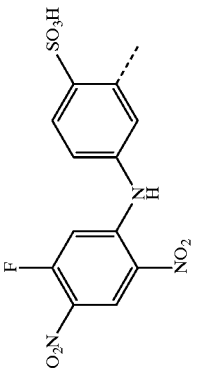 | 608 (111) greenish-navy |
| 40 | 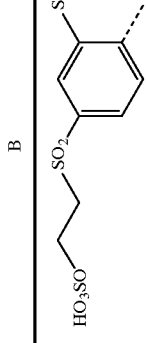 | 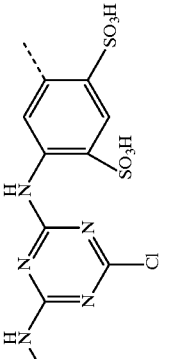 | 608 (110) greenish-navy |
| 41 | | | 608 (116) greenish-navy |

TABLE 1-continued

| Example | A | B | $\lambda_{max}$ nm ($w_{1/2}$ nm) Colour on cotton |
|---|---|---|---|
| 42 | (4-fluoro-2-nitro-5-nitrophenyl)amino-benzene with SO₃H groups | benzene with SO₃H and SO₂CH₂CH₂OSO₃H | 616 (111) dark bluish-green |
| 43 | (4-fluoro-2-nitro-5-nitrophenyl)amino-benzene with SO₃H | chlorotriazine linked to two aminobenzenes bearing SO₃H groups | 615 (120) dark bluish-green |
| 44 | (4-fluoro-2-nitro-5-nitrophenyl)amino-benzene with SO₃H | chloropyrimidine linked to aminobenzene-SO₂CH₂CH₂OSO₃H and aminobenzene-(SO₃H)₂ | 615 (118) dark bluish-green |

TABLE 1-continued

| Example | A | B | $\lambda_{max}$ nm ($w_{1/2}$ nm) Colour on cotton |
|---|---|---|---|
| 45 | (4-fluoro-2-nitro-5-nitro-phenyl)amino-(methyl-sulfophenyl) | (sulfatoethylsulfonyl-phenyl)-methyl | greenish-navy |
| 46 | (4-fluoro-2-nitro-5-nitro-phenyl)amino-(methyl-sulfophenyl) | (sulfatoethylsulfonyl)-methyl-sulfo-phenyl | dark bluish-green |
| 47 | (4-fluoro-2-nitro-5-nitro-phenyl)amino-(methyl-sulfophenyl) | (sulfatoethylsulfonyl)-sulfo-phenyl-methyl | greenish-navy |

TABLE 1-continued

| Example | A | B | λmax nm (w1/2 nm) Colour on cotton |
|---|---|---|---|
| 48 | 4-methyl-3-sulfo-phenyl with SO2CH2CH2OSO3H group | 4-methyl-3-sulfo-anilino linked to 5-fluoro-2-nitro-4-nitrophenyl | dark bluish-green |
| 49 | triazine with Cl, N(Me)(4-sulfophenyl), and NH-(4-sulfo-3-methylphenyl) | 4-methyl-3-sulfo-anilino linked to 5-fluoro-2-nitro-4-nitrophenyl | greenish-navy |
| 50 | triazine with F, N(Me)(4-sulfophenyl), and NH-(4-sulfo-3-methylphenyl) | 4-methyl-3-sulfo-anilino linked to 5-fluoro-2-nitro-4-nitrophenyl | dark bluish-green |

TABLE 1-continued

| Example | A | B | λmax nm (w1/2 nm) Colour on cotton |
|---|---|---|---|
| 51 | pyrimidine with Cl, NH-C2H4NHCOMe, and NH-(phenyl with SO3H) | phenyl-NH-(phenyl with F, NO2, NO2, SO3H) | greenish-navy |
| 52 | pyrimidine with Cl, NH-(phenyl with SO3H), NH-(phenyl with SO2C2H4SO3H) | phenyl-NH-(phenyl with F, NO2, NO2, SO3H) | dark bluish-green |
| 53 | pyrimidine with Cl, NH-(phenyl with SO3H), NH-(phenyl with SO2C2H4SO3H) | phenyl-NH-(phenyl with F, NO2, NO2, SO3H) | dark bluish-green |

TABLE 1-continued
| Example | A | B | $\lambda_{max}$ nm ($w_{1/2}$ nm) Colour on cotton |
|---|---|---|---|
| 54 | | | greenish-navy |
| 55 | | | dark bluish-green |
| 56 | | | dark bluish-green |
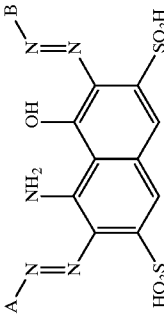

TABLE 1-continued

| Example | A | B | λ$_{max}$ nm (w$_{1/2}$ nm) Colour on cotton |
|---|---|---|---|
| 57 | | | greenish-navy |
| 58 | | | greenish-navy |
| 59 | | | dark bluish-green |

TABLE 1-continued

| Example | A | B | $\lambda_{max}$ nm ($w_{1/2}$ nm) Colour on cotton |
|---|---|---|---|
| 60 | 4-F, 2-NO₂, 5-NO₂ phenyl-NH- (on naphthalene core with OH, NH₂, 2×SO₃H, via N=N) | 4-SO₃H phenyl-NH-triazine(Cl)-NH-C₃H₄-NHCOe | dark bluish-green |
| 61 | 4-F, 2-NO₂, 5-NO₂ phenyl-NH- (on naphthalene core with OH, NH₂, 2×SO₃H, via N=N) | 4-SO₃H phenyl-NH-triazine(Cl)-NH-C₂H₄-NHCOMe | greenish-navy |

TABLE 2

| Example | A | B | $\lambda_{max}$ nm ($w_{1/2}$ nm) Colour on cotton |
|---|---|---|---|
| 62 | 4,4'-sulfonyldiphenyl | 4-sulfo-2-methylphenyl-NH-(5-fluoro-4-nitro-2-nitrophenyl) | 609 (118) dull dark green |
| 63 | 2,2'-disulfo-4,4'-biphenyl | 4-sulfo-2-methylphenyl-NH-(5-fluoro-4-nitro-2-nitrophenyl) | 608 (112) dull dark green |
| 64 | 2,2'-disulfostilbene | 4-sulfo-2-methylphenyl-NH-(5-fluoro-4-nitro-2-nitrophenyl) | 630 (130) dull dark green |

TABLE 2-continued

| Example | A | B | λ_max nm (w_{1/2} nm) Colour on cotton |
|---|---|---|---|
| 65 | | | Greenish-navy |
| 66 | | | Greenish-navy |
| 67 | | | Greenish-navy |

TABLE 3

[Structure: Naphthalene with HO₃S, SO₃H, SO₃H substituents, linked via N=N azo group to a benzene ring bearing NH₂CONH and NH groups, connected to a chlorotriazine (Cl on triazine), which connects via L to a 2,4-dinitro-5-fluorophenyl group]

| Example | L | λ$_{max}$ nm | w$_{1/2}$ nm | Colour on cotton |
|---|---|---|---|---|
| 69 | [naphthalene with HO₃S, SO₃H, SO₃H linked via N=N to benzene with two NH groups] | 415 | 139 | Golden yellow |
| 70 | Me₂N–C₆H₄–NH– | 307 | 140 | Golden yellow |
| 71 | –NH–CH₂–C₆H₄–NH– | 403 | 200 | Golden yellow |
| 72 | –N(piperazine)N–CH₂CH₂–NH– | 419 | 200 | Golden yellow |
| 73 | [benzene with two NH and SO₃H] | 366 | 119 | Golden yellow |
| 74 | NHC₂H₄NH | 410 | 170 | Golden yellow |
| 75 | [benzene with MeN, SO₃H, NH substituents] | 378 | 155 | Golden yellow |
| 76 | [benzene with two SO₃H and two NH groups] | 389 | 150 | Golden yellow |
| 77 | –N(Me)– ... –NH–C₆H₅ | 360 | 160 | Golden yellow |

TABLE 4

| Example | A | B | X | Y | Colour on cotton |
|---|---|---|---|---|---|
| 78 | 4-(2-hydroxyethylsulfonyl sulfate)phenyl | [chloro-triazine linked to 3-methyl-4-sulfophenylamino and to 2-sulfo-5-(4-fluoro-2,6-dinitroanilino)phenylamino] | NH$_2$ | OH | Greenish navy |
| 79 | phenyl | [chloro-triazine linked to 3-methyl-4-sulfophenylamino and to 3-(4-fluoro-2,6-dinitroanilino)phenylamino] | OH | NH$_2$ | Greenish navy |
| 80 | 4-sulfophenyl | [chloro-triazine linked to 3-methyl-4-sulfophenylamino and to 2-sulfo-5-(4-fluoro-2,6-dinitroanilino)phenylamino] | NH$_2$ | OH | Greenish navy |

TABLE 4-continued

| Example | A | B | X | Y | Colour on cotton |
|---|---|---|---|---|---|
| 81 | 2-SO₃H-phenyl | 3,5-disulfo-phenyl-NH-(6-Cl-triazinyl)-NH-(3-methyl-4-sulfo-phenyl), with 4-F-2,4-dinitro-phenyl-NH on other side | OH | NH₂ | Greenish navy |
| 82 | 1-SO₃H-naphth-2-yl | 2-sulfo-phenyl-NH-(6-F-triazinyl)-NH-(3-methyl-4-sulfo-phenyl), with 4-F-2,4-dinitro-phenyl-NH | NH₂ | OH | Greenish navy |
| 83 | 1,5-disulfo-naphth-2-yl | 2-sulfo-phenyl-NH-(6-F-triazinyl)-NH-(2-sulfo-4-methyl-phenyl), with 4-F-2,4-dinitro-phenyl-NH | OH | NH₂ | Greenish navy |

TABLE 4-continued

| Example | A | B | X | Y | Colour on cotton |
|---|---|---|---|---|---|
| 84 | naphthalene-1,5-disulfonic acid, 2-yl | chloro-triazine linked to 4-sulfo-3-methylanilino and to 2-sulfo-4-(2,4-dinitro-5-fluoroanilino)anilino | NH$_2$ | OH | Greenish navy |
| 85 | 2-methyl-5-sulfoanilino | chloro-triazine linked to propenyl-anilino and to 2-sulfo-4-(2,4-dinitro-5-fluoroanilino)anilino | OH | NH$_2$ | Greenish navy |
| 86 | 3-sulfophenyl | fluoro-triazine linked to 4-sulfo-3-methylanilino and to 2-sulfo-5-(4-fluoro-2,5-dinitroanilino)anilino | NH$_2$ | OH | Greenish navy |
| 87 | 4-(2-sulfatoethylsulfonyl)phenyl | chloro-triazine linked to 3-sulfo-4-methylanilino and to 2-(2-nitro-4-fluoro-5-nitroanilinoethylamino) | OH | NH$_2$ | Greenish navy |

TABLE 4-continued

| Example | A | B | X | Y | Colour on cotton |
|---|---|---|---|---|---|
| 88 | 4-(2-sulfatoethylsulfonyl)-2-sulfophenyl | piperazine-linked chlorotriazine with 2-nitro-4-fluoro-5-nitroaniline and vinylsulfonyl aniline | NH₂ | OH | Greenish navy |
| 89 | 4-(allylsulfonyl)phenyl | propylenediamine-linked fluorotriazine with 2-nitro-4-fluoro-5-nitroaniline and sulfo-methylaniline | OH | NH₂ | Navy |
| 90 | 4-(vinylsulfonyl)phenyl | ethylenediamine-linked chlorotriazine with 2-nitro-4-fluoro-5-nitroaniline and methylbenzylamine | NH₂ | OH | Navy |

TABLE 4-continued

| Example | A | B | X | Y | Colour on cotton |
|---|---|---|---|---|---|
| 91 | (benzene with HO₃S and SO₃H) | (complex structure with CO₂H, pyridinium-triazine-NH linkages, SO₃H, NH-phenyl-SO₃H, NH-phenyl with NO₂ and F) | OH | NH₂ | Greenish navy |
| 92 | (benzene with HO₃S and SO₃H) | (complex structure with Cl-triazine, NH-phenyl-SO₃H, NH-phenyl-NH-phenyl with NO₂ and F) | NH₂ | OH | Greenish navy |
| 93 | (benzene with HO₃S, SO₃H, and SO₂-vinyl) | (complex structure with F-triazine, NH-phenyl-SO₃H, NH-phenyl-NH-phenyl with NO₂ and F) | OH | NH₂ | Greenish navy |

TABLE 4-continued

| Example | A | B | X | Y | Colour on cotton |
|---|---|---|---|---|---|
| 94 | 3-methyl-4-sulfophenyl | [chloro-triazine linked to 2,4-disulfo-phenyl-NH and 4-fluoro-3,5-dinitroanilino; other triazine N-H to p-tolyl] | OH | NH$_2$ | Greenish navy |
| 95 | vinyl/SO$_3$H-substituted phenyl with second SO$_3$H | [triazine with 3-(β-sulfatoethylsulfonyl)anilino; 2-sulfo-5-(4-fluoro-3,5-dinitroanilino)anilino; 3-methyl-4-sulfoanilino] | NH$_2$ | OH | Greenish navy |

TABLE 4-continued

| Example | A | B | X | Y | Colour on cotton |
|---|---|---|---|---|---|
| 96 | (3,5-disulfophenyl-SO₂-CH₂CH₂-OSO₃H substituent) | (aryl-SO₂-CH₂CH₂-OSO₃H linked via NH to triazine, triazine linked to sulfoanilide and to 2-sulfo-4-(2,4-dinitro-5-fluoroanilino)anilino group) | OH | NH₂ | Greenish navy |
| 97 | (1,5-disulfonaphthyl) | (triazine with Cl, linked via NH to sulfoanilide and to 2-sulfo-4-(2,4-dinitro-5-chloroanilino)anilino group) | OH | NH₂ | Greenish navy |

TABLE 5

Dye = [structure: naphthalene with HO3S, SO3H, SO3H substituents, azo-linked to benzene ring with NH-triazine(Cl) and NH-phenyl(F, NO2, NO2) substituents]

| Example | Structure | λmax nm | w½nm | Colour on cotton |
|---|---|---|---|---|
| 98 | Dye-SC$_2$H$_4$OH | 407 | 148 | Golden yellow |
| 99 | Dye-N(CH$_3$)Ph | 403 | 138 | Golden yellow |
| 100 | Dye-NHC$_2$H$_4$SO$_3$H | 407 | 129 | Golden yellow |
| 101 | Dye-NHC$_2$H$_4$OC$_2$H$_4$OH | 412 | 134 | Golden yellow |
| 102 | Dye-NHC$_6$H$_3$-m-SO$_3$H | 409 | 143 | Golden yellow |
| 103 | Dye-NHC$_2$H$_4$NH-Dye | | | Golden yellow |
| 104 | Dye-NH—[piperidine-ethyl]—NH-Dye | 412 | 130 | Golden yellow |

TABLE 6

Dye = [structure: dinitrofluorophenyl-NH-benzene(SO3H)-azo-pyrazole(CO2H, OH, Me-phenyl-SO3H)-NH-triazine(Cl)]

| Example | Structure | λmax nm | w½nm | Colour on cotton |
|---|---|---|---|---|
| 105 | Dye-SC$_2$H$_4$OH | 437 | 151 | Mid yellow |
| 106 | [structure: naphthalene(HO3S, SO3H, SO3H)-azo-benzene(NH2CONH)-NH-Dye] | 430 | 135 | Mid yellow |
| 107 | Dye-NHC$_2$H$_4$OC$_2$H$_4$OH | 436 | 141 | Mid yellow |

TABLE 6-continued
Dye = 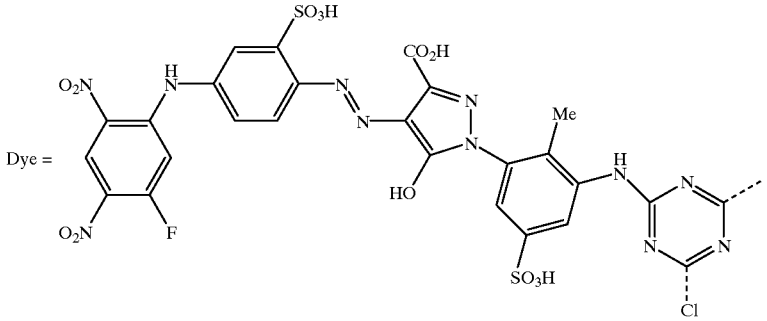
| Example | Structure | λ$_{max}$ nm | w½nm | Colour on cotton |
|---|---|---|---|---|
| 108 | 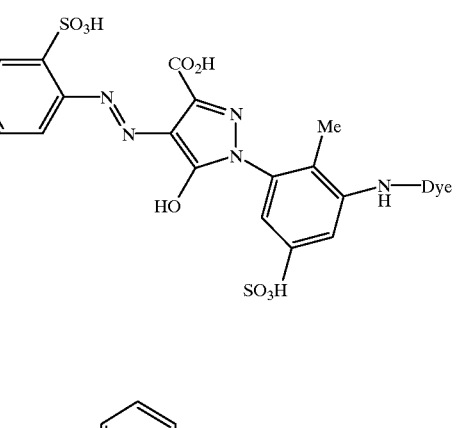 | 435 | 132 | Mid yellow |
| 109 |  | 439 | 143 | Mid yellow |
| 110 | 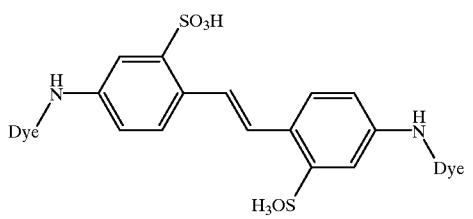 | 438 | 149 | Mid yellow |
| 111 | | 437 | 131 | Mid yellow |
| 112 | Dye-NHC$_2$H$_4$NH-Dye | | | Mid yellow |
| 113 | Dye-NHC$_3$H$_6$NH-Dye | | | Mid yellow |

TABLE 7
| Example | Structure | λ_max nm (w_{1/2} nm) Colour on cotton |
|---|---|---|
| 114 | | 435 (172) mid yellow |
| 115 | | 422 (148) golden yellow |
| 116 | | 406 (124) golden yellow |
TABLE 8
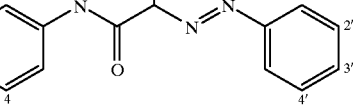
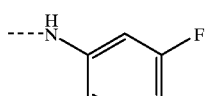
| Example | | Other Substituents | Colour on cotton |
|---|---|---|---|
| 117 | 4- | 1,3-$(SO_3H)_2$ 3-$SO_2C_2H_4OSO_2H$ | Yellow |
| 118 | 3- | 1,4-$(SO_3H)_2$ 2'-$SO_2C_2H_4OSO_3H$ | Yellow |
| 119 | 4- | 1,1'-$(SO_3H)_2$ | Yellow |

TABLE 8-continued

[Structure: diazo compound with phenyl-NH-C(=O)-CH(N=N-phenyl)-C(=O)-Me, phenyl positions labeled 1,2,3,4 and 1',2',3',4']

[Substituent structure: -NH-(phenyl with F, O₂N, NO₂ groups)]

| Example | O₂N / NO₂ position | Other Substituents | | Colour on cotton |
|---|---|---|---|---|
| 120 | 4- | 1,1'-(SO₃H)₂ | 4'- [triazine with Cl, NH-, NH-phenyl-SO₃H] | Yellow |
| 121 | 4'- | 1,1',4-(SO₃H)₃ | 3'- [triazine with F, NH-, NH-phenyl-SO₂C₂H₄OSO₃H]<br>3- [triazine with Cl, NH-, NH-phenyl-SO₃H] | Yellow |

TABLE 9

[Structure: pyridone core with OH, Me, Y substituents; N-CH2CH2-N(X)(B) side chain; N=N-A azo group]

| Example | A | B | X | Y | Colour on cotton |
|---|---|---|---|---|---|
| 122 | 4-methyl-3-sulfo-phenyl-SO2-CH2CH2-OSO3H | 4-fluoro-2,5-dinitrophenyl (F, NO2, O2N) | H | H | Greenish-yellow |
| 123 | 3-sulfo-4-methyl-phenyl-NH-(5-fluoro-2-nitro-4-nitrophenyl) | 4-fluoro-2,5-dinitrophenyl | H | CN | Greenish-yellow |
| 124 | triazine with Cl, NH-(4-sulfo-3-methylphenyl), NH-(4-(SO2CH2CH2OSO3H)phenyl) | 4-fluoro-2-nitro-5-cyanophenyl | H | CONH2 | Greenish-yellow |
| 125 | triazine with Cl, NH-(4-sulfo-3-methylphenyl), NH-(2,5-disulfophenyl) | 4-fluoro-2,5-dinitrophenyl | C2H4OH | H | Greenish-yellow |

TABLE 9-continued
| Example | A | B | X | Y | Colour on cotton |
|---|---|---|---|---|---|
| 126 | [structure] | [structure] | C₂H₄OH | CONH₂ | Greenish-yellow |
| 127 | [structure] | [structure] | H | H | Greenish-yellow |

TABLE 10

| Example | A | B | X | Y | Colour on cotton |
|---|---|---|---|---|---|
| 128 | 4-(β-sulfatoethylsulfonyl)phenyl | 4-fluoro-2,5-dinitrophenyl (methyl) | SO₃H | H | Bluish red |
| 129 | 3-(β-sulfatoethylsulfonyl)phenyl | 4-fluoro-2,5-dinitrophenyl (methyl) | SO₃H | H | Bluish red |
| 130 | 4-(β-sulfatoethylsulfonyl)phenyl | 4-fluoro-2,5-dinitrophenyl (methyl) | H | SO₃H | Bluish red |
| 131 | 2-sulfo-4-(β-sulfatoethylsulfonyl)phenyl | 2-fluoro-4-nitro-5-cyanophenyl (methyl) | SO₃H | H | Bluish red |
| 132 | 2-sulfo-5-(4-fluoro-2-nitro-5-nitroanilino)phenyl | 4-fluoro-2,5-dinitrophenyl (methyl) | SO₃H | H | Bluish red |

(Note: Columns A and B contain structural formulas; descriptions given in text form.)

TABLE 10-continued
| Example | A | B | X | Y | Colour on cotton |
|---|---|---|---|---|---|
| 133 | 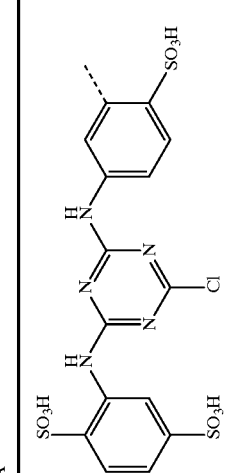 | 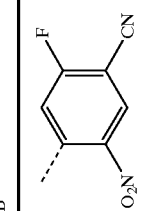 | H | SO$_3$H | Bluish red |
| 134 | 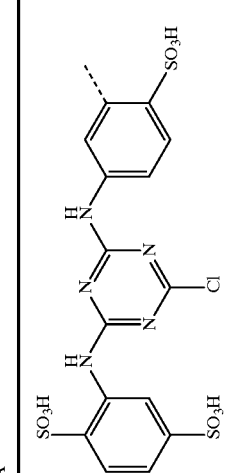 | 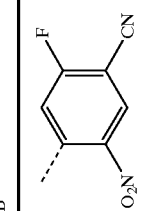 | SO$_3$H | H | Bluish red |
| 135 | 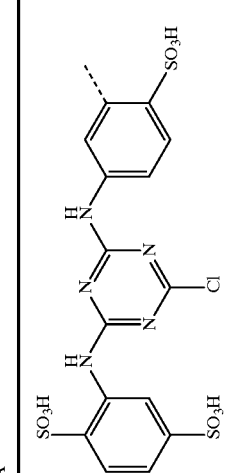 | 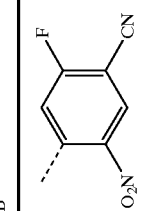 | SO$_3$H | H | Bluish red |

TABLE 10-continued

| Example | A | B | X | Y | Colour on cotton |
|---|---|---|---|---|---|
| 136 | | | SO₃H | H | Bluish red |
| 137 | | | H | SO₃H | Bluish red |
| 138 | | | SO₃H | H | Bluish red |

TABLE 11

[Structure: naphthalene core with A—N=N— at one position, OH, HO₃S, NH—B, and X substituents]

| Example | A | B | X | Colour on cotton |
|---------|---|---|---|------------------|
| 139 | 3-(HO₃SOCH₂CH₂SO₂)-phenyl | 4-F-2-NO₂-5-(O₂N)-phenyl (2-fluoro-5-nitro with O₂N) | H | Red |
| 140 | 4-(HO₃SOCH₂CH₂SO₂)-phenyl | 4-F-2-NO₂-5-(O₂N)-phenyl | SO₃H | Red |
| 141 | 2-SO₃H-5-(HO₃SOCH₂CH₂SO₂)-phenyl | 4-F-2-NO₂-5-(O₂N)-phenyl | H | Red |
| 142 | 4-(HO₃SOCH₂CH₂SO₂)-phenyl | 4-F-2-CN-5-(O₂N)-phenyl | SO₃H | Red |
| 143 | 2-SO₃H-4-[(4-F-5-NO₂-2-O₂N-phenyl)NH]-phenyl | 4-F-2-NO₂-5-(O₂N)-phenyl | H | Red |

TABLE 11-continued

| Example | A | B | X | Colour on cotton |
|---|---|---|---|---|
| 144 | (4-sulfophenyl-SO2-CH2CH2-OSO3H) linked via NH to chlorotriazine linked via NH to 3-methyl-4-sulfophenyl | 5-fluoro-4-nitro-2-cyanophenyl | SO3H | Red |
| 145 | 2-sulfo-5-sulfophenyl-NH-chlorotriazine-NH-(3-methyl-4-sulfophenyl) | 5-fluoro-4-nitro-2-nitrophenyl | SO3H | Red |
| 146 | 4-fluoro-2-nitro-5-nitrophenyl-NH-(2-methyl-5-sulfophenyl) | 2,6-dichloropyrimidin-4-yl | SO3H | Red |
| 147 | 4-fluoro-2-nitro-5-nitrophenyl-NH-(2-methyl-5-sulfophenyl) | 6-fluoro-2-[(3-sulfophenyl)amino]pyrimidin-4-yl | H | Red |

TABLE 11-continued

| Example | A | B | X | Colour on cotton |
|---|---|---|---|---|
| 148 | (structure) | (structure) | H | Red |
| 149 | (structure) | (structure) | SO₃H | Red |

TABLE 12

[Structure: naphthalene core with A-N=N- group, OH, HO3S, SO3H, and -N(B)(-Y)(-Y) substituents]

| Example | A | B | X | Y | Colour on cotton |
|---------|---|---|---|---|------------------|
| 150 | 4-(HO3SOCH2CH2SO2)-phenyl | 4-F-2,5-dinitrophenyl (F, NO2; O2N) | H | H | Reddish yellow |
| 151 | 3-(HO3SOCH2CH2SO2)-phenyl | 4-F-2,5-dinitrophenyl | H | SO3H | Reddish yellow |
| 152 | 4-(HO3SOCH2CH2SO2)-2-SO3H-phenyl | 4-F-2,5-dinitrophenyl | Me | H | Reddish yellow |
| 153 | 4-(HO3SOCH2CH2SO2)-2-SO3H-phenyl | 4-F-2-CN-5-nitrophenyl | H | H | Reddish yellow |
| 154 | 2-SO3H-5-[(4-F-5-nitro-2-nitrophenyl)NH]-phenyl | 4-F-2,5-dinitrophenyl | H | H | Orange |

TABLE 12-continued

| Example | A | B | X | Y | Colour on cotton |
|---|---|---|---|---|---|
| 155 | 2,5-disulfo-phenyl-NH-(4-chloro-triazinyl)-NH-(phenyl-3-SO₃H, 4-) | 5-fluoro-4-cyano-2-nitro-phenyl (methyl) | H | SO₃H | Orange |
| 156 | 4-(2-sulfatoethylsulfonyl)phenyl-NH-(6-chloro-triazinyl)-NH-(phenyl-2-SO₃H, 4-) | 5-fluoro-4-nitro-2-nitro-phenyl (methyl) | Me | H | Orange |
| 157 | 4-fluoro-2,5-dinitro-phenyl-NH-(phenyl-2-SO₃H, 4-) | 2,6-dichloro-4-methyl-pyrimidinyl | H | H | Orange |

TABLE 12-continued

Structure for B:

[Naphthalene core with OH, HO3S, SO3H substituents, azo linkage to A, and amine linkage N(B)-Y with Y substituent]

| Example | A | B | X | Y | Colour on cotton |
|---------|---|---|---|---|------------------|
| 158 | 4-SO3H, 2-Me phenyl linked via NH to 5-F, 2-NO2, 4-O2N phenyl | 3-sulfophenyl-NH-(4-chloro-6-methylpyrimidin-2-yl) | H | H | Orange |
| 159 | 4-Me, 3-SO3H phenyl linked via NH to 5-F, 2-NO2, 4-O2N phenyl | 3-(2-sulfatoethylsulfonyl)phenyl-NH-(4-chloro-6-methylpyrimidin-2-yl) | H | SO3H | Orange |
| 160 | 4-SO3H, 5-Me, 2-SO3H phenyl linked via NH to 5-F, 2-NO2, 4-O2N phenyl | 4-(2-sulfatoethylsulfonyl)phenyl-NH-(4-anilino-6-methylpyrimidin-2-yl) | Me | H | Orange |

TABLE 13
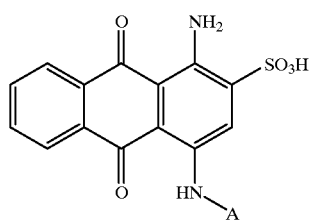
| Example | A | Colour on cotton |
|---|---|---|
| 161 | 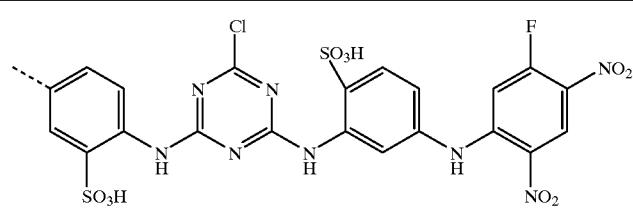 | Greenish blue |
| 162 | 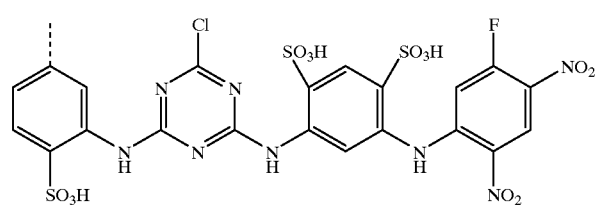 | Greenish blue |
| 163 | 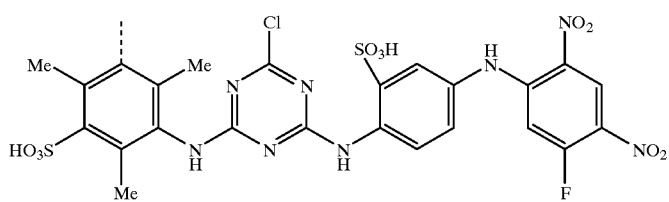 | Greenish blue |
| 164 | 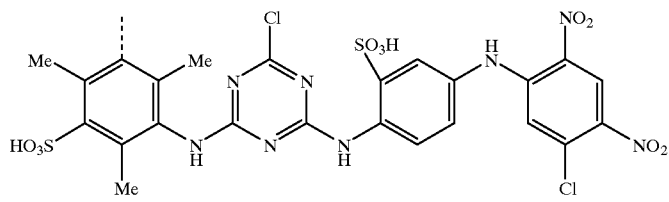 | Greenish blue |

TABLE 14
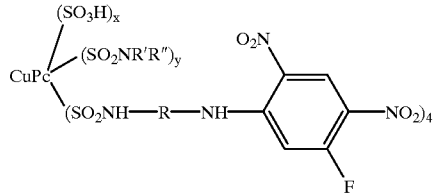
| Example | R | R' | R" | x | y | z | Colour on cotton |
|---|---|---|---|---|---|---|---|
| 165 | 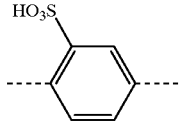 | H | H | 2 | 0 | 2 | Green |
| 166 | 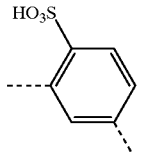 | H | H | 1.5 | 0.5 | 2 | Green |
| 167 | $C_2H_4$ | H | H | 2 | 0 | 2 | Bluish-green |
| 168 | $C_3H_6$ | $CH_3$ | $CH_3$ | 1.7 | 0.3 | 2 | Bluish-green |
| 180 |  | H | $C_2H_4OSO_3H$ | 2.5 | 0.5 | 1 | Green |
| 170 | 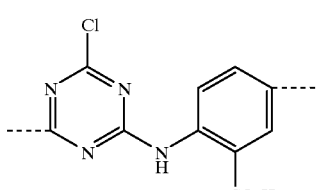 | H | H | 1.5 | 1.5 | 1 | Green |

TABLE 14-continued
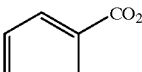
| Example | R | R' | R" | x | y | z | Colour on cotton |
|---|---|---|---|---|---|---|---|
| 171 | 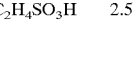 | H | $C_2H_4SO_3H$ | 2.5 | 0 | 1.5 | Green |
| 172 | 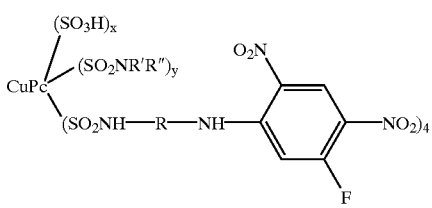 | H | H | 3 | 0 | 1 | Green |

TABLE 15

[Structure: central fused tri-ring system with O, N bridges; substituents X and Y on central ring; SO₃H groups; A—NH and NH—B amine substituents]

| Example | A | B | X | Y | Colour on cotton |
|---|---|---|---|---|---|
| 173 | —(CH₂)₂NH—(2-NO₂,4-NO₂,5-F-phenyl) | —(CH₂)₂NH—(2-NO₂,4-NO₂,5-F-phenyl) | Cl | Cl | Blue |
| 174 | —(CH₂)₂NH—(2-NO₂,4-NO₂,5-F-phenyl) | —(CH₂)₂NH—(2-NO₂,4-NO₂,5-F-phenyl) | Cl | Cl | Blue |
| 175 | —(CH₂)₂NH—(2-NO₂,4-NO₂,5-F-phenyl) | —(CH₂)₂NH—(2-NO₂,4-NO₂,5-F-phenyl) | Cl | Et | Blue |

TABLE 15-continued
| Example | A | B | X | Y | Colour on cotton |
|---|---|---|---|---|---|
| 176 | 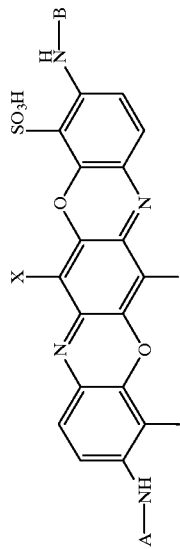 | 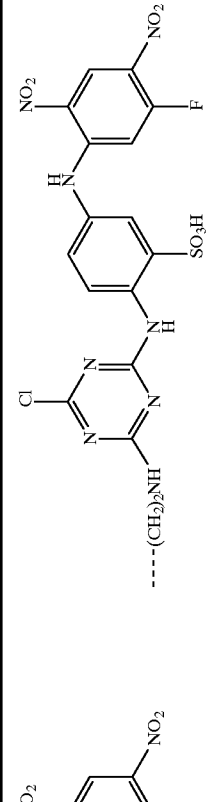 | Cl | Cl | Greenish blue |
| 177 | 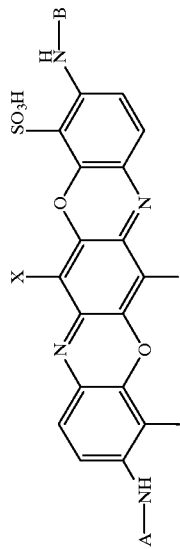 | 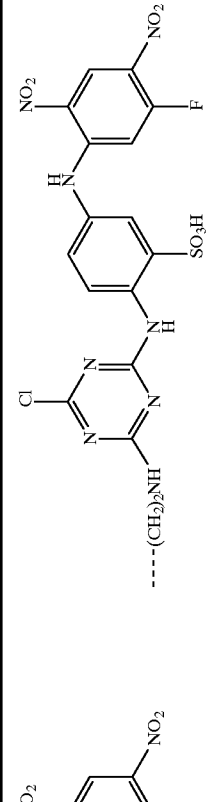 | Cl | Et | Greenish blue |
| 178 | 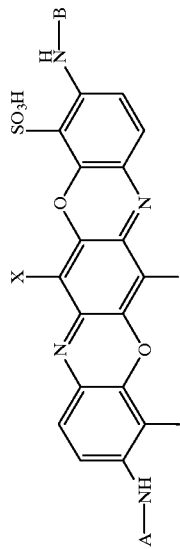 | 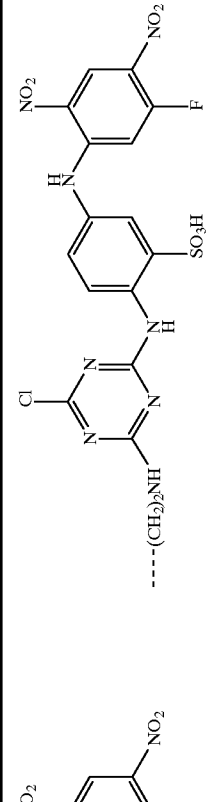 | Cl | Cl | Greenish blue |

TABLE 15-continued

Core structure:

Phenoxazine-type chromophore with substituents X and Y at the central positions, SO₃H groups, and A—NH and NH—B substituents.

| Example | A | B | X | Y | Colour on cotton |
|---------|---|---|---|---|------------------|
| 179 | H | 4-sulfophenyl linked via NH to a fluoro-triazine, further linked through NH to a 2,5-disulfophenyl-NH- group and to a 4-fluoro-2,4-dinitrophenyl-NH group | Cl | Cl | Greenish blue |
| 180 | —(CH₂)₂NH— linked to 6-chloropyrimidine, then —NH—(CH₂)₂—NH— to 4-fluoro-2,4-dinitrophenyl | —(CH₂)₂NH— linked to 6-chloropyrimidine, then —NH—(CH₂)₂—NH— to 4-fluoro-2,4-dinitrophenyl | Cl | Me | Blue |
| 181 | —(CH₂)₂NH— linked to 6-chloropyrimidine, then NH to 3,5-disulfophenyl-NH-(5-chloro-2,4-dinitrophenyl) | —(CH₂)₂NH— linked to 6-chloropyrimidine, then NH to 3,5-disulfophenyl-NH-(5-chloro-2,4-dinitrophenyl) | Cl | Cl | Greenish blue |

TABLE 16

[Structure: Copper complex dye with SO3H, CO2, O, HN-A groups coordinated to Cu, azo linkages to phenyl-X]

| Example | A | X | Colour on cotton |
|---------|---|---|------------------|
| 182 | [Chlorotriazine linked via NH to benzene with SO3H, NH-phenyl(F, 2,4-NO2, NO2)] | H | Dull greenish blue |
| 183 | [Chlorotriazine-NH-benzene(SO3H, SO3H)-NH-phenyl(NO2, F, NO2)] | H | Dull greenish blue |
| 184 | [Fluorotriazine-NH-benzene(SO3H)-NH-phenyl(NO2, NO2, F)] | H | Dull greenish blue |
| 185 | [Chlorotriazine-NH-benzene(SO3H, SO3H)-NH-phenyl(F, CN, NO2)] | H | Dull greenish blue |
| 186 | [Chlorotriazine-NHC2H4NH-phenyl(F, NO2, NO2)] | H | Dull blue |

TABLE 16-continued

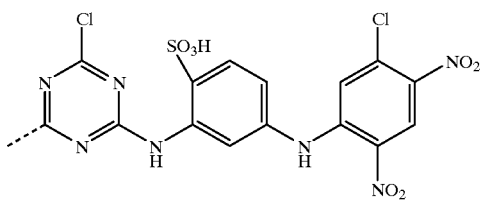

| Example | A | X | Colour on cotton |
|---|---|---|---|
| 187 | 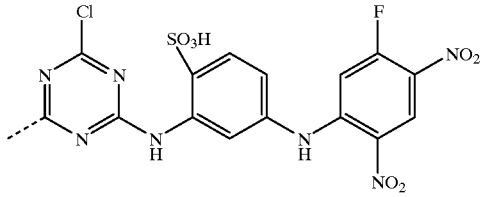 | H | Dull greenish blue |
| 188 | 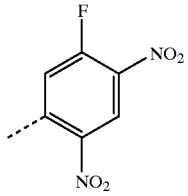 | 3-SO$_3$H | Dull greenish blue |
| 189 | 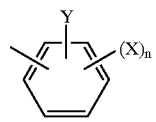 | 4-SO$_2$C$_4$H$_6$OSO$_3$H | Dull greenish blue |

What is claimed is:

1. A dye comprising
at least one chromophore D;
at least a first, halobenzene, reactive group $Z^1$, of the formula (I)

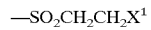 (I)

wherein: n is 1 or 2;
X, or each X independently is an electronic withdrawing group; and
Y is a halogen atom;
at least a second reactive group $Z^2$ selected from the group consisting of:
a group of the formula (IV)

—SO$_2$CH$_2$CH$_2$X$^1$ (IV)

wherein X$^1$ is an eliminatable group; and
a group of the formula (V)

—SO$_2$(CH$_2$)$_z$CH=CH$_2$ (V)

wherein z is zero or 1;
at least a first linking group $L^3$, linking said first, halobenzene, reactive group $Z^1$ to one of components (i) a chromophore D and (ii) the second reactive group $Z^2$, which said first linking group $L^3$ presents an amino nitrogen to the reactive group $Z^1$ and to the component (i) or, when component (i) contains a heterocyclic nitrogen atom, is linked directly to the nitrogen atom and which said first linking group $L^1$ optionally includes a hydrocarbon bridging group, which hydrocarbon bridging group B has at least two carbon atoms, is optionally substituted, optionally includes at least one hetero atom and is optionally a chromophore; and
optionally at least one aromatic group Ar which may carry the said reactive group $Z^2$; which dye is selected from the group consisting of dyes of the formulae (VIII), (XXX), (XXXI), (XXXII), (XXXVI) and (XXXVII), wherein: formula (VIII) is:

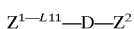 (VIII)

wherein:

D is a chromophore;

$L^{11}$ is a group of $L^1$, which is an amine or piperazine linkage of the formula

 (VII)$^1$;

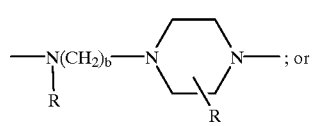 ; or (VII)$^2$

 (VII)$^3$ wherein: R, or each R independently, is hydrogen or optionally substituted $C_{1-4}$alkyl;

B is a hydrocarbon bridging group which has at least two carbon atoms, is optionally substituted, optionally includes at least one hetero atom and is optionally a chromophore;

b is from 2 to 6 inclusive; and each of $Z^1$ and $Z^2$ is as defined above;

formula (XXX) is:

 (XXX)

wherein: $Z^3$ is a third reactive group selected from the groups of the formulae (I)–(III), wherein: formula (I) is given and defined above;

formula (II) is

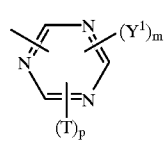 (II)

wherein:

m is 1 or 2;

p is 0 or 1;

when m is 1, p is 1; and when m is 2, p is 0;

$Y^1$, or each $Y^1$ independently, is a halogen atom or an optionally substituted pyridinium group; and T is $C_{1-4}$ alkoxy, thioalkoxy or $N(R^1)(R^2)$ in which $R^1$ is hydrogen, optionally substituted $C_{1-4}$ alkyl or optionally substituted aryl; and formula (III) is

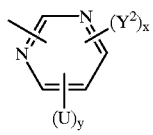 (III)

wherein:

X is 1, 2 or 3;

y is zero, 1 or 2; and x+y≦3;

$Y^2$, or each $Y^2$ independently, is a halogen atom or an optionally substituted pyridinium group; and U, or each U independently, is $C_{1-4}$ alkyl or $C_{1-4}$ alkylsulphonyl;

$J^1$ is an optionally substituted aryl group or a chromophore;

$L^3$ is a linking group linking one of $Z^3$ and $J^1$ to D;

$L^4$ is a linking group linking $Z^3$ and $J^1$;

each of q, r and s independently, is zero or 1; and each of $Z^1$, $Z^2$ and $L^2$ is as defined above;

formula (XXXI) is:

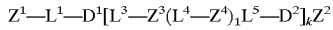 (XXXI)

wherein: $D^1$ is a first chromophore;

$D^2$ is a second chromophore;

$Z^3$, when present, is a third reactive group selected from the groups of the formulae (I)-(III), given and defined above;

$Z^4$, when present, is a fourth reactive group selected from the groups of the formulae (I)–(III), given and defined above;

$L^3$ 3 is a linking group linking $Z^3$ to $D^1$;

$L^4$ is a linking group linking $Z^3$ to $Z^4$;

$L^5$ is a linking group linking $D^2$ to one of $Z^3$ and $Z^4$;

each of k and l, independently, is zero or 1; and each of $Z^1$, $Z^2$ and $L^1$ is as defined above;

formula (XXXII) is:

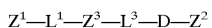 (XXXII)

wherein: $Z^3$ is a third reactive group selected from the groups (I)–(III), given and defined above and $L^3$ is a third linking group selected from the groups (VII)$^1$, (VII)$^2$ and (VII)$^3$, given and defined above;

$Z^2$ is a second reactive group selected from the groups (IV)–(V), given and defined above; and each of $Z^1$ and $L^1$ is as defined above;

formula (XXXVI) is:

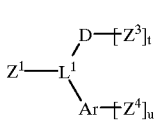 (XXXVI)

wherein: one of $Z^3$ and $Z^4$ is a reactive group $Z^2$ selected from the formulae (IV) and (V) given and defined above;

the other of $Z^3$ and $Z^4$, independently, is a reactive group selected from the formulae (IV) and (V), given and defined above, and formula given and defined below;

each of t and u, independently, is zero or 1 and at least one of t and u is 1;

when $Z^3$ is a reactive group $Z^2$, t is 1 and when $Z^4$ is a reactive group $Z^2$, u is 1;

D is a chromophore;

Ar is an optionally substituted aryl group;

$L^1$ is a group of the formula (XLI)

$$—(R)N—B—N(R)—$$
$$\phantom{—(R)N—}|$$
$$\phantom{—(R)N—}N(R)$$
(XLI)

wherein B and each R, independently, is as defined above;

$Z^1$ is a group of the formula (I), given and defined above; and wherein: formula (VI) is $$—W—C(R^{10})=CH_2 \quad (VI)$$

wherein: $R^{10}$ is hydrogen, $C_{1-4}$alkyl or halogen; and

W is —OC(=O)— or —N($R^{11}$)C(=O)— in which $R^{11}$ is hydrogen or $C_{1-4}$alkyl; and formula (XXXVII) is:

$$Z^1—L^1—D^N—Z^2 \quad (XXXVII)$$

wherein: $D^N$ is a chromophore containing a heterocyclic group including a nitrogen atom;

$L^1$ is a group of the formula $(VII)^4$ or $(VII)^5$, $(VII)^4$ $(VII)^5$ wherein B is a hydrocarbon bridging group which has at least two carbon atoms, is optionally substituted, optionally includes at least one hetero group and is optionally a chromophore, R is hydrogen or $C_{1-4}$ alkyl and b is from 2 to 6 inclusive;

which group of the formula $(VII)^4$ or $(VII)^5$ is directly attached via the bond ①, to the nitrogen atom of the said chromophore $D^N$;

and each of $Z^1$ and $Z^2$ is as defined above.

2. A dye according to claim 1, wherein the linking group $L^1$ has the formula $(VII)^1$ $$N(R) \quad (VII)^1$$

wherein R is hydrogen or optionally substituted $C_{1-4}$ alkyl, such that the same amino group presents itself to each of the reactive group $Z^1$ and the component (i), as defined in claim 1.

3. A dye according to claim 1, wherein the linking group $L^3$ is a piperazinoalkylamino group of the formula $(VII)^2$ $(VII)^2$ wherein each R, independently, is hydrogen or optionally substituted $C_{1-4}$ alky, such that the same amino group presents itself to each of the reactive group $Z^1$ and the component (i), as defined in claim 1.

4. A dye according to claim 1, wherein the linking group $L^1$ has the formula $(VII)^3$ $$—N(R)BN(R)— \quad (VII)^3$$

wherein B is a hydrocarbon bridging group as defined in claim 1, each R, independently, is as defined in claim 1 and B is optionally linked additionally to at least one additional group —N(R).

5. A dye according to claim 4, wherein the hydrocarbon bridging group B is an optionally substituted aryl group.

6. A dye according to claim 1, of the formula (VIII)

$$Z^1—L^{11}—D—Z^2 \quad (VIII)$$

wherein:

D is a chromophore;

$L^{11}$ is a group of $L^1$ which is an amine or piperazine, linkage of the formula $$—N(R)— \quad (VII)^1$$

; or $(VII)^2$ $$—N(R)BN(R)— \quad (VII)^3$$

wherein; R, or each R independently, is hydrogen or $C_{1-4}$ alkyl;

B is a hydrocarbon bridging group which has at least two carbon atoms, is optionally substituted, optionally includes at least one hetero atom and is optionally a chromophore;

b is from 2 to 6 inclusive;

$Z^1$ is a group (I)

in which: n is 1 or 2;

X, or each X independently, is an electron withdrawing group; and

Y is a halogen atom; and $Z^2$ is:

$$—SO_2CH_2CH_2X^1 \quad (IV)$$

in which $X^1$ is an eliminatable group; or $$—SO_2(CH_2)_zCH=CH_2 \quad (V)$$

wherein z is zero or 1.

7. A dye according claim 1, wherein, in formula (I), X, or each X independently, is selected from nitro, cyano, alkylsulphonyl, dialkylaminosulphonyl and sulphonic acid or a salt thereof.

8. A dye according to claim 2, wherein R, or each R independently, ie hydrogen.

9. A dye according to claim 1, wherein D is an azo chromophore.

10. A dye according to claim 9, wherein D is a monoazo chromophore.

11. A dye according to claim 10, which has the formula (XVII)

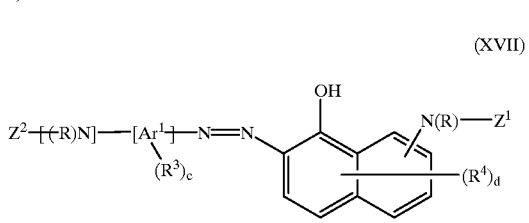

(XVII)

wherein: R is halogen, optionally substituted $C_{1-4}$ alkyl or optionally substituted aryl;

$Z^1$ is of the formula (I);

wherein formula (I) is

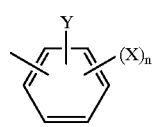

(I)

wherein: n is 1 or 2;

X, or each X independently, is an electron withdrawing group; and

Y is a halogen atom;

$Z^2$ is of the formula $$—SO_2CH_2CH_2X^1 \quad (IV)$$

wherein $X^1$ is an eliminatable group; or $$—SO_2(CH_2)_zCH=CH_2 \quad (V)$$

wherein Z is zero or 1;

Ar is a benzene or naphthalene nucleus;

$R^3$, or each $R^3$ independently, is $C_{1-4}$ alkyl, nitro, halo or sulphonic acid or salt thereof;

c is zero or 1–4;

$R^4$, or each $R^4$ independently, is a sulphonic acid or a salt thereof; and d is 1 or 2.

12. A dye according to claim 9, wherein D is a disazo chromophore.

13. A dye according to claim 12, which has the formula (XVIII)

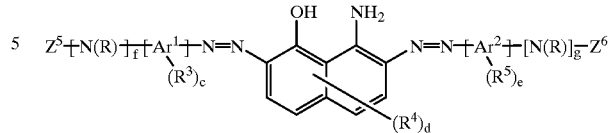

(XVIII)

wherein: one of $Z^5$ and $Z^6$ is a group $Z^1$ and the other is a group $Z^2$;

each of f and g independently is zero or 1;

when $Z^5$ or $Z^6$ is a group of the formula (I), f or g respectively is 1 and when $Z^5$ or $Z^6$ is any of the groups of the formulae (IV) and (V), f or g respectively is zero;

wherein: formula (I) is

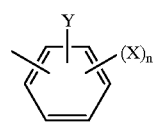

(I)

wherein: n is 1 or 2;

X, or each X independently, is an electron withdrawing group; and

Y is a halogen atom;

wherein: formula (IV) is $$—SO_2CH_2CH_2X^1 \quad (IV)$$

wherein $X^1$ is an eliminatable group; and formula (V) is $$—SO_2(CH_2)_zCH=CH_2 \quad (V)$$

wherein z is zero or 1;

each of c and e, independently, is zero or 1–4;

d is 1 or 2;

each R independently is hydrogen or optionally substituted $C_{1-4}$ alkyl, such that the same amino group presents itself to each of the reactive group $Z^1$ and the component (i) wherein component (i) is a chromophore D;

each of $Ar^1$ and $Ar^2$ is an optionally substituted aryl group; and each of $R^3$ and $R^4$ is $C_{1-4}$ alkyl, nitro, halo or sulphonic acid or salt thereof.

14. A dye according to claim 13, wherein one of $Z^5$ and $Z^6$ is a group

(I)

wherein:

X is an electron withdrawing group, Y is a halogen atom and n is 1 or 2 and the other of $Z^5$ and $Z^6$ is the group $—SO_2CH_2CH_2OSO_3H$ or $—SO_2CH=CH_2$.

15. A dye according to claim 14, has the formula (XLIII)

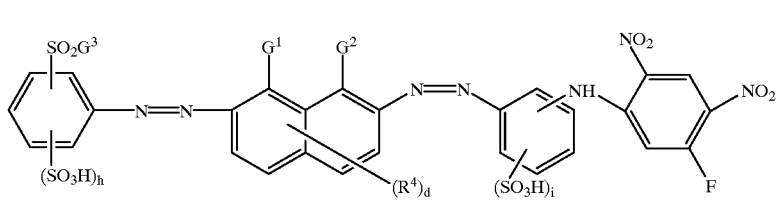

(XLIII)

wherein: G³ is $C_2H_4OSO_3H$ or a salt thereof or —CH=CH₂;

G¹ and G¹ are different and are OH or NH₂;

R⁴ is sulphonic acid or a salt thereof and d is 1 or 2; and each of h and i, independently, is zero, 1 or 2.

16. A dye according to claim 15, wherein the dye has the formula (XLIV)

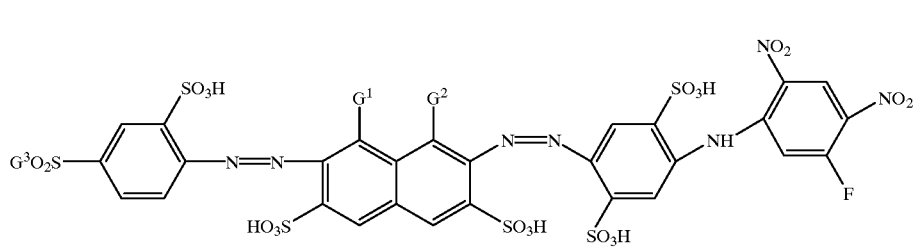

(XLIV)

where each of G¹ and G² is different and is OH or NH₂ and G¹ is $C_2H_4OSO_3H$ or a salt thereof or —CH=CH₂.

17. A dye according to claim 1, of the formula (XXX)

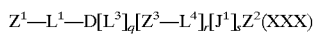

wherein: Z³ is a third reactive group selected from the groups of the formulae (I)–(III), wherein: formula (I) is

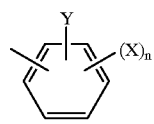

(I)

in which: n is 1 or 2;

X, or each X independently, is an electron withdrawing group; and

Y is a halogen atom;

formula (II) is

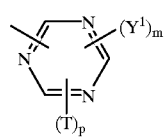

(II)

wherein m is 1 or 2;

p is 0 or 1;

when m is 1, p is 1; and when m is 2, p is 0;

Y¹, or each Y¹ independently, is a halogen atom or an optionally substituted pyridinium group; and T is $C_{1-4}$ alkoxy, $C_{1-4}$ thioalkoxy or $N(R^1)(R^2)$, wherein each of R¹ and R² independently is halogen, optionally substituted $C_{1-4}$ alkyl or optionally substituted aryl; and formula (III) is

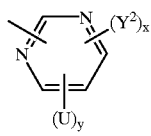

(III)

wherein: x is 1, 2, or 3;

y is zero, 1 or 2; and x+y≦3;

Y², or each Y² independently, is a halogen atom or an optionally substituted pyridinium group; and U or each U independently, is $C_{1-4}$ alkyl or $C_{1-4}$ alkyl-sulphonyl;

J¹ is an optionally substituted aryl group or a chromophore;

L³ is a linking group linking one of Z³ and J¹ to D;

L⁴ is a linking group linking Z³ and J¹;

each of q, r and s, independently, is zero or 1; and each of Z¹, Z² and L¹ is as defined in claim 1.

18. A dye according to claim 17, wherein each of L³ and L⁴, independently, is selected from one of the groups of the formulae (VII)¹, (VII)² and (VII)³,

—N(R)—; (VII)¹

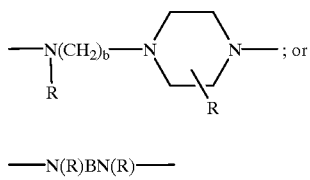
(VII)²

—N(R)BN(R)— (VII)³ wherein: R, or each R independently, is hydrogen or $C_{1-4}$ alkyl;

B is a hydrocarbon bridging group which has at least two carbon atoms, is optionally substituted, optionally includes at least one hetero atom and is optionally a chromophore; and b is from 2 to 6 inclusive.

19. A dye according to claim 18, wherein each of $L^3$ and $L^4$ is a group of the formulae (VII)¹,

—N(R)— (VII)¹ wherein R, or each R independently, is hydrogen or $C_{1-4}$ alkyl.

20. A dye according to claim 7, wherein q is 1, r is zero and s is 1.

21. A dye according to claim 20, wherein $L^3$ is a group of the formula (VII)³

—N(R)BN(R)— (VII)³ wherein D is a triazine group substituted by a non-reactive group.

22. A dye according to claim 17, wherein the chromophore D is an azo chromophore derived from 1-hydroxy-8-aminoaphthalene substituted by at least one sulphamic acid group.

23. A dye according to claim 1 of the formula (XXXI)

 (XXXI)

wherein:

$D^1$ is a first chromophore;

$D^2$ is a second chromophore;

$Z^3$, when present, is a third reactive group selected from the groups of the formulae (I)–(III), given and defined in claim 17;

$Z^4$ when present, is a fourth reactive group selected from the groups of the formulae (I)–(III), given and defined in claim 17;

$L^3$ is a linking group linking $Z^3$ to $D^1$;

$L^4$ is a linking group linking $Z^3$ to $Z^4$;

$L^5$ is a linking group linking $D^2$ to one of $Z^3$ and $Z^4$;

each of k and l, independently, is zero or 1; and each of $Z^1$, $Z^2$ and $L^1$ is as defined in claim 1.

24. A dye according to claim 1, of the formula (XXXII)

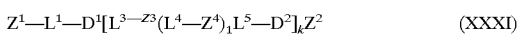 (XXXII)

wherein: $Z^3$ is a third reactive group selected from the groups (I)–(III), given and defined in claim 17; and $L^3$ is a third linking group selected from the groups (VII)¹, (VII)² and (VII)³,

—N(R)— (VII)¹

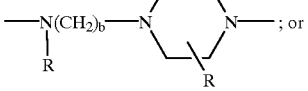
(VII)²

—N(R)BN(R)— (VII)³ wherein: R, or each R independently, is hydrogen or $C_{1-4}$ alkyl;

B is a hydrocarbon bridging group which has at least two carbon atoms, is optionally substituted, optionally includes at least one hetero atom and is optionally a chromophore; and b is from 2 to 6 inclusive;

$Z^2$ is a second reactive group selected from the groups (IV)–(V), given and defined in claim 1; and each of $Z^1$ and $L^1$ is as defined in claim 1.

25. A dye according to claim 24, wherein $L^1$ is a linking group of the formula (VII)² or (VII)³,

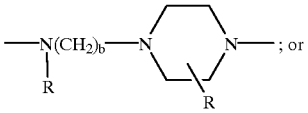
(VII)²

—N(R)BN(R)— (VII)³ wherein: R, or each R independently, is hydrogen or $C_{1-4}$ alkyl;

B is a hydrocarbon bridging group which has at least two carbon atoms, is optionally substituted, optionally includes at least one hetero atom and is optionally a chromophore; and b is from 2 to 6 inclusive.

26. A dye according to claim 24, wherein $Z^3$ is a group of the formula (II),

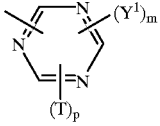 (II)

wherein m is 1 or 2;

p is 0 or 1;

when m is 1, p is 1; and when m is 2, p is 0, $Y^1$, or each $Y^1$ independently, is a halogen atom or an optionally substituted pyridinium group; and T is $C_{1-4}$alkoxy, $C_{1-4}$thioalkoxy or $N(R^1)(R^2)$, wherein each of $R^1$ and $R^2$ independently is halogen, optionally substituted $C_{1-4}$alkyl or optionally substituted aryl.

27. A dye according to claim 24, wherein the chromophore D is a disazo dye containing a residue derived from H-acid and having azo groups at the 2- and 7- positions.

28. A dye according to claim 1, wherein D is a group of the formula (XLII)

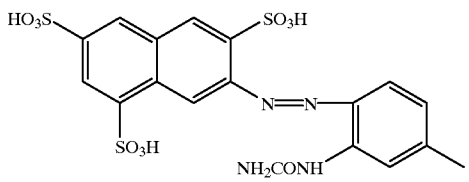

(XLII)

29. A dye according to claim 1, of the formula (XXXVI)

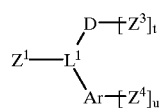

(XXXVI)

wherein:
one of $Z^3$ and $Z^4$ is a reactive group $Z^2$ selected from the formulae (IV) and (V), given and defined below;
the other of $Z^3$ and $Z^4$, independently, is a reactive group selected from the formulae (IV)–(VI), given and defined below;
each of t and u, independently, is zero or 1 and at least one of t and a is 1;
when $Z^3$ is a reactive group $Z^2$, t is 1 and when $Z^4$ is a reactive group $Z^2$, a is 1;
D is a chromophore;
Ar is an optionally substituted aryl group;
$L^1$ is a group of the formula (XLI)

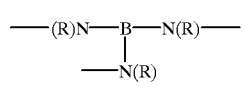

(XLI)

wherein each R, independently, is hydrogen or optionally substituted $C_{1-4}$ alkyl; and
$Z^1$ is a group of the formula (I), given and defined below;
wherein: formula (I) is

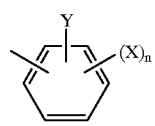

(I)

wherein: n is 1 or 2;
X, or each X independently, is an electron withdrawing group; and
Y is a halogen atom;
formula (IV) is

—$SO_2CH_2CH_2X^1$    (IV)

wherein $X^1$ is an eliminatable group;
formula (V) is

—$SO_2(CH_2)_zCH=CH_2$    (V)

wherein z is zero or 1; and
formula (VI) is

—W—$C(R^{10})$=$CH_2$    (VI)

wherein: $R^{10}$ is hydrogen, $C_{1-4}$ alkyl or halogen; and
W is —OC(=O)— or —N($R^{11}$)C(=O)— in which $R^{11}$ is hydrogen or $C_{1-4}$ alkyl.

30. A dye according to claim 29, wherein D is a disazo dye containing a residue derived from H-acid.

31. A dye according to claim 1, of the formula (XXXVII)

$Z^1$—$L^1$—$D^N$—$Z^2$    (XXXVII)

wherein: $D^N$ is a chromophore containing a heterocyclic group including a nitrogen atom;
$L^1$ is a group of the formula (VII)$^4$ or (VII)$^5$,

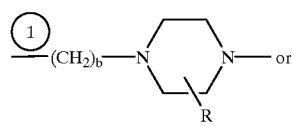

(VII)$^4$

(VII)$^5$ wherein B is a hydrocarbon bridging group which has at least two carbon atoms, is optionally substituted, optionally includes at least one hetero group and is optionally a chromophore, R is hydrogen or $C_{1-4}$ alkyl and b is from 2 to 6 inclusive;
which group of the formula (VII)$^4$ or (VII)$^5$ is directly attached via the bond ①, to the nitrogen atom of the said chromophore $D^N$;
and $Z^1$ is a halobenzene of the formula (I)

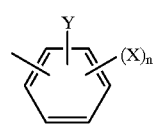

(I)

wherein: n is 1 or 2;
X, or each X independently, is an electron withdrawing group; and
Y is a halogen atom;
$Z^2$ is selected from the group consisting of
(4) a group of the formula (IV)

—$SO_2CH_2CH_2X^1$    (IV)

wherein $X^1$ is an eliminatable group; and
(5) a group of the formula (V)

—$SO_2(CH_2)_zCH=CH_2$    (V)

wherein z is zero or 1.

32. A dye according to claim 31, wherein the chromophore D has the formula (XLII)

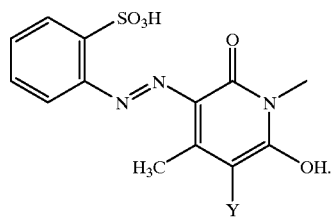

(XLII)

33. A dye according to claim 10, which is an azo dye having at least two azo groups therein.

34. A dye according to my claim 9, wherein D is a trisazo or tetrakisazo chromophore.

35. A dye of the formula

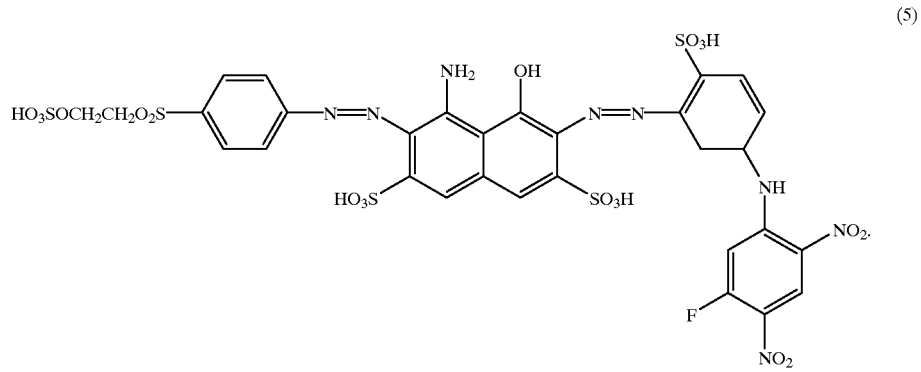

(5)

36. A dye of the formula

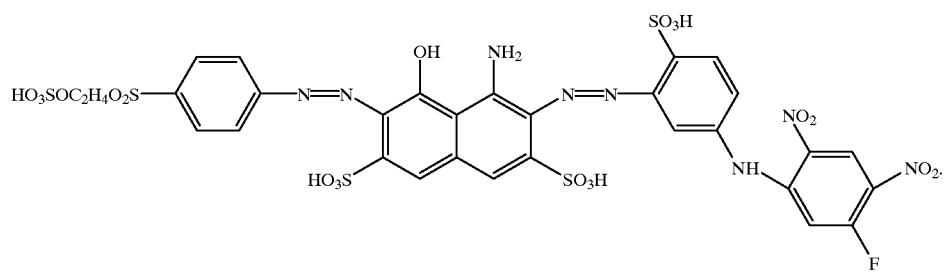

(45)

37. A process for preparing a dye of the formula (VIII)³

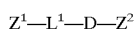

(VIII)³ wherein:

D is a chromophore

L¹ is N(R), in which R is hydrogen or $C_{1-4}$ alkyl;

Z¹ is a group

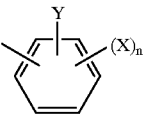

(I)

in which
n is 1 or 2;
X, or each X independently, is an electron withdrawing group; and
Y is a hydrogen atom; and
Z² is a group of the formula (IV)

(IV)

wherein X¹ is an eliminatable group; or a group of the formula (V)

—SO₂(CH₂)₂CH=CH₂ (V)

wherein z is zero or 1;

which process comprises reacting a chromophoric compound of the formula (XXIV)

(XXIV)

wherein D and Z² are as defined above, with a dihalobenzene compound of the formula (XXI)

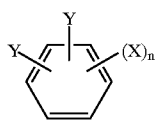

(XXI)

wherein each of X, Y and n is as defined above, to obtain the dye of the formula (VIII)$^3$.

38. A process for the colouration of a substrate, which process comprises applying to the substrate a dye according to claim 1.

39. A process according to claim 38, wherein the dye is applied to the substrate by exhaust dyeing, padding or printing.

40. A process according to claim 39, wherein the dye is applied by ink jet printing.

* * * * *

UNITED STATES PATENT AND TRADEMARK OFFICE
CERTIFICATE OF CORRECTION

PATENT NO. : 6,399,751 B1
DATED : June 4, 2002
INVENTOR(S) : Warren James Ebenezer et al.

It is certified that error appears in the above-identified patent and that said Letters Patent is hereby corrected as shown below:

Column 1,
Line 20, "Again dyes" should read --Again, dyes--.

Column 2,
Line 45, "components (i) the" should read --components (i)--;
Line 58 "one of (i) the or a" should read --one of (i) or a--.

Column 3,
Line 35, "Alternatively the" should read --Alternatively, the--;
Line 36, arylene especially" should read --arylene, especially--;
Line 37, "phenylene group." should read --phenylene, group.--;
Line 53, "–N(R)–(VII)$^1$;" should read -- –N(R)–; (VII)$^1$ --.

Column 4,
Line 65, "–SO$_2$(CH$_2$)$_2$CH–CH$_2$" should read -- –SO$_2$(CH$_2$)$_2$CH=CH$_2$ --.

Column 6,
Line 42, "linking Z$^3$ and J$^2$;" should read --linking Z$^2$ and J$^2$;--.
Line 66, "by a non reactive" should read --by a non-reactive--.

Column 7,
Line 36, "each of Z$^1$ and Z$^4$ is" should read --each of Z$^3$ and Z$^4$ is--.
Before Line 66, insert text from Column 8, lines 35-60.

Column 8,
Lines 35-60, delete in their entirety.

Column 11,
Line 35,   "   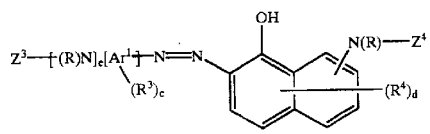   (XVII)   "

should read --   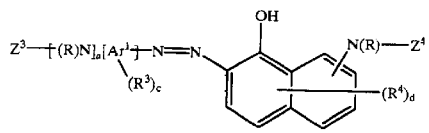   (XVII)   --.

UNITED STATES PATENT AND TRADEMARK OFFICE
CERTIFICATE OF CORRECTION

PATENT NO. : 6,399,751 B1
DATED : June 4, 2002
INVENTOR(S) : Warren James Ebenezer et al.

It is certified that error appears in the above-identified patent and that said Letters Patent is hereby corrected as shown below:

Column 13,
Line 66, "each of $G^1$ $G^2$ and" should read --each of $G^1$, $G^2$ and--.

Column 15,
Line 36, "copper phthalccyanine" should read --copper phthalocyanine--;
Line 40, "each of $R^{21}$ and $R^{23}$," should read --each of $R^{21}$ and $R^{22}$--;
Line 59, "each $Y^1$ independently" should read --each $Y^3$ independently--;
Line 64, "alkoxy." should read --$C_{1-4}$ alkoxy.--;
Line 66, "$T^1$ and $T^3$ are" should read --$T^1$ and $T^2$ are--.

Column 16,
Line 12, "each of q and z is" should read --each of q and r is--;
Line 40, "value of 0, 1 or 2." should read --value of 0, 1 or 2;--;
Line 55, "$\alpha$ is zero or 1;" should read --a is zero or 1;--;
Line 63, "$Z^2–L^1–D–L^2–Z^2$" should read --$Z^1–L^1–D–L^2–Z^2$--.

Column 17,
Line 15, "$X_n$ or each X independently," should read --X, or each X independently,--;
Line 46, "couple or, to the benzene" should read --couple on to the benzene--.

Column 18,
Line 55, "is 2, D is 0;" should read --is 2, p is 0;--;
Line 56, "$Y^2$, or each $Y^1$ independently," should read --$Y^1$, or each $Y^1$ independently,--;
Line 62, "$Y^2$, or each $Y^1$ independently," should read --$Y^2$, or each $Y^2$ independently,--.

Column 19,
Line 4, "obtain a of the" should read --obtain a dye of the--;
Line 8, "(III)$^3$" should read --(VIII)$^3$--;
Line 38, "–$SO_2$ $(CH_2)_2$ $_{CH=CH2}$(V)" should read ---$SO_2$ $(CH_2)_2$ $CH=CH_2$--;
Line 67, "10 to 12, pH levels" should read --10 to 12; pH levels--.

Column 20,
Line 9, "that commercially" should read --that is commercially--;
Line 32, "process ran be" should read --process can be--;
Line 33, "constant during" should read --constant pH, that is to say that the pH of the dyebath remains constant or substantially constant during--;
Line 55, "enhanced converting" should read --enhanced by converting--;
Line 61, "dye by" should read --dye followed by--;
Line 67, "campfires" should read --comprises--.

UNITED STATES PATENT AND TRADEMARK OFFICE
CERTIFICATE OF CORRECTION

PATENT NO.    : 6,399,751 B1
DATED         : June 4, 2002
INVENTOR(S)   : Warren James Ebenezer et al.

It is certified that error appears in the above-identified patent and that said Letters Patent is hereby corrected as shown below:

Column 21,
Line 13, "n-proponol" should read --n-propanol--;
Line 31, "crop." should read --drop.--;
Line 55, "in water (600 ml)" should read --in water (800 ml)--;
Line 56, "at PH 7.5." should read --at pH 7.5.--;

Column 22,
Line 7, "was Cooled to" should read --was cooled to--;
Line 9, "a mull amount" should read --a small amount--;
Line 13, "strength=69.3%)." should read --strength=68.3%).--;
Line 14, "(0-O1M, 11.18 g)" should read --(0.O1M, 11.78 g)--;

Column 23,
Line 2, "sulphuric acid" should read --sulphonic acid--;
Line 19, "the resulting yellow" should read --The resulting yellow--;
Line 20, "stirred at 0-20° C. for" should read --stirred at 0-2° C. for--;

Column 24,
Line 19, "The N-diachlorotriazinyl" should read --The N-dichlorotriazinyl--;
Line 20, ""7-aminonaphthalena-1,3,6-" should read --7-aminonaphthalene-1,3,6- --;
Line 49, "(8.4 of mmol)" should read --(8.4 mmol)--;
Line 51, "at 8.5 by" should read --at 8.5 by addition--;
Line 53, "was concentrates" should read --was concentrated--;
Line 67, "Examples 76 to 97" should read --Examples 78 to 97--.

Column 25,
Line 20, "fabric 5 parts)" should read --fabric (5 parts)--;
Line 35, "good tastness" should read --good fastness--;
Line 46, "(9.5 part of 50°/0" should read --(9.5 parts of 50%--;
Line 49, "The cloth to" should read --The cloth was--.

Column 26,
Line 11, "(48edge, 700 parts)" should read --(48 degße, 700 parts)--;
Line 21, "specially formulate for" should read --specially formulated for--;
Line 26, "described in E2-A-" should read --described in EP-A- --;
Line 37, "for ink let" should read --for ink jet--;
Line 46, "had to decreased to 1 micro reciprocal ohm," should read --had decreased to 1 micro reciprocal ohm.--;
Line 50, "addition or water" should read --addition of water,--;
Line 57, "navy of black," should read --navy or black,--.
Line 60, "ion exchange to" should read --ion exchanged to--.

UNITED STATES PATENT AND TRADEMARK OFFICE
CERTIFICATE OF CORRECTION

PATENT NO. : 6,399,751 B1
DATED : June 4, 2002
INVENTOR(S) : Warren James Ebenezer et al.

It is certified that error appears in the above-identified patent and that said Letters Patent is hereby corrected as shown below:

Table 1, Example 6,

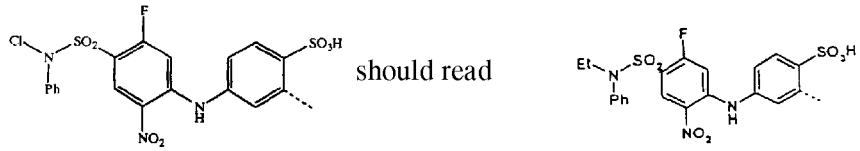

Table 1, Example 7

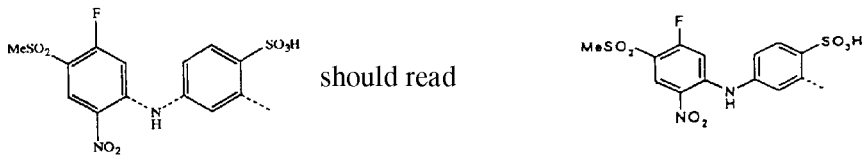

Table 1, Example 9, "616 (121)" should read --618 (121)--.
Table 1, Example 12

Table 1, Example 18

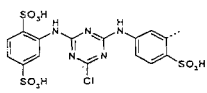

Table 1, Example 19

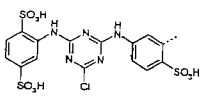

Table 1, Example 20, "596 120)" should read --596 (120)--.
Table 1, Example 24, "drak bluish-" should read --dark bluish- --.
Table 1, Example 28, "dark blusish-" should read --dark bluish- --.
Table 1, Example 28

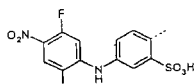

UNITED STATES PATENT AND TRADEMARK OFFICE
CERTIFICATE OF CORRECTION

PATENT NO. : 6,399,751 B1
DATED : June 4, 2002
INVENTOR(S) : Warren James Ebenezer et al.

It is certified that error appears in the above-identified patent and that said Letters Patent is hereby corrected as shown below:

Table 1, Example 40, "608 (110)" should read --608 (116)--.
Table 1, Example 43, "dark blusish-" should read --dark bluish- --.
Table 1, Example 52

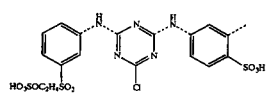 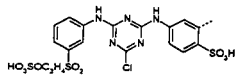

Table 1, Example 54

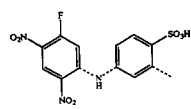 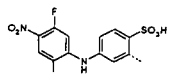

Table 1, Example 60

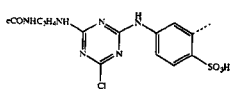 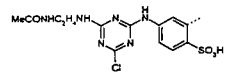

Table 2, Example 67

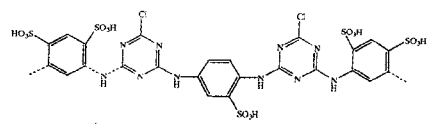 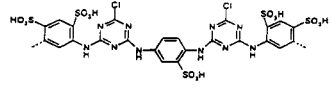

Table 3, delete Line numbers.
Table 3, Example 70, "307" should read --367--.
Table 3, Example 77,

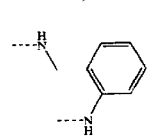 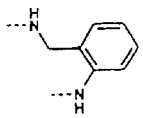

Table 4, Example 85,

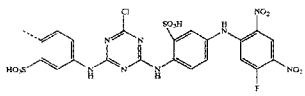 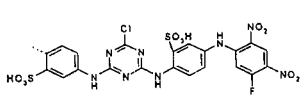

Table 4, Example 88,

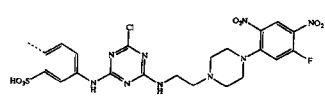 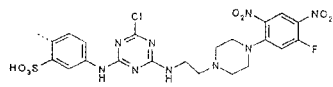

UNITED STATES PATENT AND TRADEMARK OFFICE
CERTIFICATE OF CORRECTION

PATENT NO.    : 6,399,751 B1
DATED         : June 4, 2002
INVENTOR(S)   : Warren James Ebenezer et al.

It is certified that error appears in the above-identified patent and that said Letters Patent is hereby corrected as shown below:

Table 4, Example 96,

Table 5, Example 104,

Table 6, Header, both occurrences.

Table 6, Example 111,

Table 8, Example 117, "1,2-(SO₃H)₂ 3-SO₂C₂H₄OSO₂H" should read
-- 1,2-(SO₃H)₂   3'-SO₂C₂H₄OSO₂H --

Table 9, Example 127,

Table 10, Example 134,

Table 10, Example 137,

UNITED STATES PATENT AND TRADEMARK OFFICE
CERTIFICATE OF CORRECTION

PATENT NO.     : 6,399,751 B1
DATED          : June 4, 2002
INVENTOR(S)    : Warren James Ebenezer et al.

It is certified that error appears in the above-identified patent and that said Letters Patent is hereby corrected as shown below:

Table 13, Header,

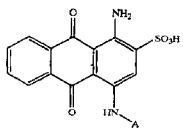
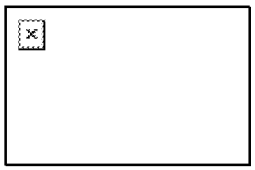

Table 14, Header, both occurrences.

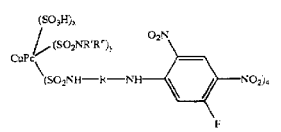
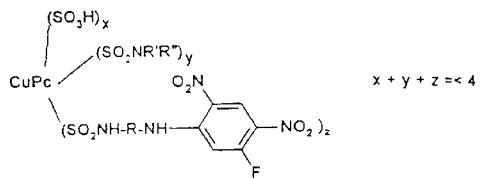

Table 14, "Example 180", should be renumbered as --Example 169--.
Table 15, Example 173

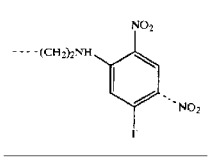
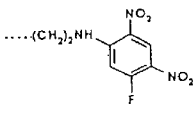

Table 15, Example 174, both occurrences.

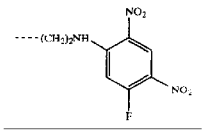
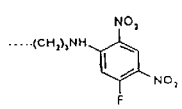

Table 15, Example 181,

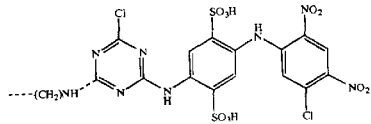
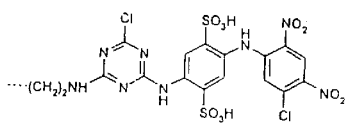

Table 16, Example 189, "4-SO$_2$C$_4$H$_6$OSO$_3$H" should read --4-SO$_2$C$_2$H$_4$OSO$_3$H--.

Column 129,
Line 62, "an electronic withdrawing" should read --an electron withdrawing--.

Column 130,
Line 54, "group L$^3$, linking" should read --group L$^1$, linking--;
Line 57, "group L$^3$ presents" should read --group L$^1$ presents--.

UNITED STATES PATENT AND TRADEMARK OFFICE
CERTIFICATE OF CORRECTION

PATENT NO. : 6,399,751 B1
DATED : June 4, 2002
INVENTOR(S) : Warren James Ebenezer et al.

It is certified that error appears in the above-identified patent and that said Letters Patent is hereby corrected as shown below:

Column 131,
Line 6, Formula (VIII), "$Z^1-L^{11}-D-Z^2$" should read --$Z^1-L^{11}-D-^2$--.

Column 132,
Line 37, "$L^3$ 3 is a linking" should read --$L^3$ is a linking--;
Line 67, "formula given" should read --formula (1V), given--.

Column 133,
Line 20, formula (VI), "$-W-C(R^{10})=CH_2$(VI)" should read -- $-W-C(R^{10})=CH_2$     (VI)--;
Line 67, "$L^3$ is a" should read --$L^1$ is a--.

Column 134,
Line 10, "alky, such that" should read --alkyl, such that--;
Line 44, "wherein; R," should read --wherein: R,--.

Column 135,
Line 6, "according claim 1," should read --according to claim 1,--.
Formula (XVII),

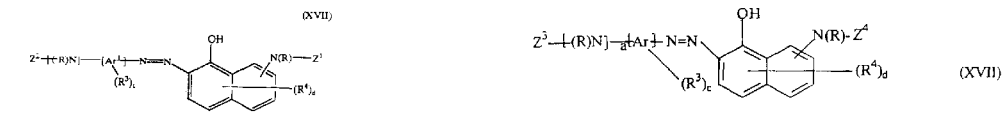

Line 7, "according claim 1," should read --according to claim 1,--;
Line 30, "R is" should read --R independently and a is--;
Line 32, "$Z^1$( is of the formula (I);" should read --one of Z3 and Z4 is a group Z1 and the other is a group Z2; the group Z4 is selected from the groups of the formulae (I)-(III);--:

Column 137,
After Line 15, insert text from Column 138, lines 12-14;
Line 31, "$G^1$ is $C_2H_4OSO_3H$ or" should read --$G^3$ is $C_2H_4OSO_3H$ or--;
formula (XXX) "$Z^1-L^1-D[L^3]_q[Z^3-L^4]_r]J^1]_sZ^z$(XXX)" should read --$Z^1-L^1-D[L^3]_q[Z^3-L^4]_r]J^1]_sZ^z$     (XXX)--.

Column 138,
Lines 12-14, delete in their entirety.

UNITED STATES PATENT AND TRADEMARK OFFICE
CERTIFICATE OF CORRECTION

PATENT NO. : 6,399,751 B1
DATED : June 4, 2002
INVENTOR(S) : Warren James Ebenezer et al.

It is certified that error appears in the above-identified patent and that said Letters Patent is hereby corrected as shown below:

Column 139,
Line 26. "according to claim 7," should read --according to claim 17,--;
Line 34, "wherein D is" should read --wherein B is--,
Line 38, "8-aminoaphthalcnc substituted by at least one sulphamic" should read --8-aminonaphthalene substituted by at least one sulphonic--;
formula (XXXI),
"$Z^1-L^1-D[L^3-Z^3](L^4-Z^4)_lL^5-D^2]_kZ^2$" should read --$Z^1-L^1-D[L^3-Z^3](L^4-Z^4)_lL^5-D^2]_kZ^2$--;
Line 51, "$Z^4$ when present," should read --$Z^4$, when present,--;

Column 140,
Line 59, "when m is 2, p is 0," should read --when m is 2, p is 0;--.

Column 143,
Line 13, "according to claim 10," should read --according to claim 17.--.

Signed and Sealed this

Fifth Day of October, 2004

JON W. DUDAS
*Director of the United States Patent and Trademark Office*